US009356289B2

(12) United States Patent
Nagai et al.

(10) Patent No.: US 9,356,289 B2
(45) Date of Patent: May 31, 2016

(54) SECONDARY BATTERY

(75) Inventors: Hiroki Nagai, Nagoya (JP); Masahiro Morita, Toyota (JP); Takashi Iwao, Kadoma (JP)

(73) Assignee: Toyota Jidosha Kabushiki Kaisha, Aichi (JP)

( * ) Notice: Subject to any disclaimer, the term of this patent is extended or adjusted under 35 U.S.C. 154(b) by 102 days.

(21) Appl. No.: 13/884,645

(22) PCT Filed: Nov. 12, 2010

(86) PCT No.: PCT/JP2010/070243
§ 371 (c)(1),
(2), (4) Date: Jul. 23, 2013

(87) PCT Pub. No.: WO2012/063370
PCT Pub. Date: May 18, 2012

(65) Prior Publication Data
US 2013/0288121 A1    Oct. 31, 2013

(51) Int. Cl.
*H01M 4/485* (2010.01)
*H01M 4/13* (2010.01)
*H01M 4/505* (2010.01)
(Continued)

(52) U.S. Cl.
CPC ............... *H01M 4/485* (2013.01); *H01M 4/13* (2013.01); *H01M 4/505* (2013.01); *H01M 4/525* (2013.01); *H01M 10/052* (2013.01); *H01M 4/131* (2013.01); *H01M 10/0587* (2013.01); *H01M 2004/021* (2013.01); *Y02E 60/122* (2013.01); *Y02T 10/7011* (2013.01)

(58) Field of Classification Search
CPC . Y02T 10/7011; Y02E 60/122; H01M 4/505; H01M 4/525; H01M 4/485; H01M 4/131; H01M 10/0587; H01M 10/052; H01M 2004/021
See application file for complete search history.

(56) References Cited

U.S. PATENT DOCUMENTS 5,702,845 A    12/1997   Kawakami et al.
2005/0221182 A1   10/2005   Fujiwara et al.
(Continued)

FOREIGN PATENT DOCUMENTS

CN    102612772    7/2012
JP    10-255763    9/1998
(Continued)

OTHER PUBLICATIONS

English translations of JP Publications 2003-272609, Sep. 2003; 2010-097813, Apr. 2010; 2010-015904, Jan. 2010; 2005-285606, Oct. 2005; 2001-110424, Apr. 2001.*
(Continued)

*Primary Examiner* — Brittany Raymond
(74) *Attorney, Agent, or Firm* — Finnegan, Henderson, Farabow, Garrett & Dunner, LLP

(57) ABSTRACT

A secondary battery 100 includes: a positive electrode mixture layer 223 containing a positive electrode active material 610 and an electrically conductive material 620; a positive electrode current collector 221 on which the positive electrode mixture layer 223 is coated; a negative electrode mixture layer 243 containing a negative electrode active material 710; and a negative electrode current collector 241 on which the negative electrode mixture layer 243 is coated, wherein a porosity A1 of the positive electrode mixture layer 223 satisfies $0.30 \leq A1$ and, at the same time, a porosity A2 of the negative electrode mixture layer 243 satisfies $0.30 \leq A2$.

21 Claims, 19 Drawing Sheets

(51) Int. Cl.
 *H01M 4/525* (2010.01)
 *H01M 10/052* (2010.01)
 *H01M 4/131* (2010.01)
 *H01M 10/0587* (2010.01)
 *H01M 4/02* (2006.01)

(56) References Cited

U.S. PATENT DOCUMENTS

| | | |
|---|---|---|
| 2007/0003835 A1 | 1/2007 | Hasegawa et al. |
| 2008/0241701 A1 | 10/2008 | Okumura et al. |
| 2012/0282525 A1 | 11/2012 | Nagai et al. |

FOREIGN PATENT DOCUMENTS

| | | | |
|---|---|---|---|
| JP | 11-031534 | | 2/1999 |
| JP | 2001-110424 | * | 4/2001 |
| JP | 2001-332246 | | 11/2001 |
| JP | 2003-272609 | * | 9/2003 |
| JP | 2005-285606 | * | 10/2005 |
| JP | 2007-109636 | | 4/2007 |
| JP | 2009-123671 | | 6/2009 |
| JP | 2010-015904 | * | 1/2010 |
| JP | 2010-15904 | | 1/2010 |
| JP | 2010-97813 | | 4/2010 |
| JP | 2010-097813 | * | 4/2010 |
| JP | 2011-119092 | | 6/2011 |
| WO | WO 2012/063369 A1 | | 5/2012 |

OTHER PUBLICATIONS

Office Action for U.S. Appl. No. 13/884,628 dated Jan. 16, 2015.
Office Action for U.S. Appl. No. 13/884,628 dated Mar. 12, 2015.
Notice of Allowance and Fee(s) Due and Notice of Allowability for U.S. Appl. No. 13/884,628 dated Jul. 9, 2015.
Supplemental Notice of Allowability for U.S. Appl. No. 13/884,628 dated Oct. 14, 2015.

* cited by examiner

SECONDARY BATTERY

CROSS-REFERENCE TO RELATED APPLICATIONS

This application is a national phase application of International Application No. PCT/JP2010/070243, filed Nov. 12, 2010, the content of which is incorporated herein by reference.

TECHNICAL FIELD

The present invention relates to a secondary battery. Examples of a secondary battery include a lithium-ion secondary battery.

In the present specification, "secondary battery" is a term which describes repetitively chargeable storage devices in general and which encompasses so-called storage batteries such as a lithium-ion secondary battery, a nickel hydride battery, and a nickel-cadmium battery as well as storage elements such as an electrical double layer capacitor.

In addition, in the present specification, the term "lithium-ion secondary battery" encompasses secondary batteries which use lithium ions as electrolyte ions and in which charging and discharging are realized by the movement of electrons accompanying lithium ions between a positive electrode and a negative electrode. In general, batteries referred to as a "lithium-ion secondary battery" are typical examples that are included in the lithium secondary battery according to the present specification.

BACKGROUND ART

For example, Patent Literature 1 described below discloses a non-aqueous electrolyte solution secondary battery comprising a positive electrode, a negative electrode that stores and releases lithium ions, and a non-aqueous electrolyte solution. More specifically, the positive electrode is structured such that a positive electrode layer including a lithium complex metal oxide containing nickel and a vinylidene fluoride-based fluoro-rubber is supported by a current collector. In addition, as measured by the mercury intrusion method, the positive electrode layer has a porosity of 20% to 50% and a pore volume of 10 $mm^3$/g to 150 $mm^3$/g with respect to pores in a diameter range of 0.1 μm to 3 μm. Patent Literature 1 describes that, due to this configuration, a non-aqueous electrolyte solution secondary is obtained which has a high energy density and which is superior in both large-current discharge characteristics and charge-discharge cycling characteristics.

CITATION LIST

Patent Literature

Patent Literature 1: Japanese Patent Application Laid-open No. H10-255763

SUMMARY OF INVENTION

In recent years, in applications of secondary batteries as typified by a lithium-ion secondary battery in which the secondary battery is used mounted on an automobile as a drive source, the secondary battery is required to produce output that is significantly higher than in applications related to portable terminals and home electric appliances. For example, with a battery required to produce high output such as a vehicle-mounted battery, it is important that an internal resistance of the battery is kept low. If a reaction resistance inside a battery can be reduced, a battery with lower internal resistance and more superior output characteristics can be realized.

A secondary battery comprises a positive electrode mixture layer containing a positive electrode active material and an electrically conductive material, a positive electrode current collector on which the positive electrode mixture layer is coated, a negative electrode mixture layer containing a negative electrode active material, and a negative electrode current collector on which the negative electrode mixture layer is coated. In this case, a porosity A1 of the positive electrode mixture layer satisfies 0.30≤A1 and, at the same time, a porosity A2 of the negative electrode mixture layer satisfies 0.30≤A2. Accordingly, lithium ions (Li) can respectively migrate readily between the positive electrode active material and an electrolyte solution and between the negative electrode active material and the electrolyte solution. In addition, electron transfer at the positive electrode mixture layer becomes smoother.

In this case, the porosity A1 of the positive electrode mixture layer and the porosity A2 of the negative electrode mixture layer may satisfy A1≤A2. When A1≤A2 is true in a case where the porosity A1 of the positive electrode mixture layer is the same, an effect of an increase in the porosity A1 of the positive electrode mixture layer is better demonstrated compared to a case where A1>A2, and a resistance of the secondary battery can be reduced.

In addition, in a micropore distribution of differential micropore volume with respect to micropore diameter as measured by the mercury intrusion method, the positive electrode mixture layer may have a first peak at which a micropore diameter D1 satisfies D1≤0.25 μm and a second peak at which a micropore diameter D2 is greater than the micropore diameter D1 at the first peak. In this case, the first peak micropore diameter D1 is attributable to holes in the electrically conductive material in the positive electrode mixture layer, and since the first peak micropore diameter D1 is small, the electrically conductive material in the positive electrode mixture layer is densely aggregated. Therefore, electron transfer in the positive electrode mixture layer becomes smoother. As a result, during charging, due to the migration of the lithium ions (Li) and the transfer of electrons becoming smoother, charging can be performed efficiently at high speed. In addition, during discharging, due to the migration of the lithium ions (Li) and the transfer of electrons becoming smoother, the resistance of the battery is reduced and battery output is improved.

The positive electrode active material may have secondary particles formed by an aggregation of a plurality of primary particles of a lithium transition metal oxide and a hollow portion formed in the secondary particles. Furthermore, the positive electrode active material may have through holes penetrating the secondary particles so as to connect the hollow portion and the outside.

In addition, for example, the positive electrode active material may be a lithium transition metal oxide which has a layered structure and which contains nickel (Ni) as a constituent element. Furthermore, in a favorable mode, the positive electrode active material may be a lithium transition metal oxide which has a layered structure and which contains nickel (Ni), cobalt (Co), and manganese (Mn) as constituent elements. Moreover, in a favorable mode, the positive electrode active material may be expressed as $Li_{1+x}(Ni_yCo_zMn_{1-y-z}M_\gamma)O_2$, where 0≤x≤0.2, 0.5≤y≤1.0, 0≤z≤0.5, 0≤γ≤0.2, and 0≤(1−y−z), and M is composed of at least one element selected from the element group consisting of F, B, Al, W, Mo, Cr, Ta, Nb, V, Zr, Ti, Y, Ca, Mg, Fe, and Na.

DESCRIPTION OF EMBODIMENTS

Figure 1:
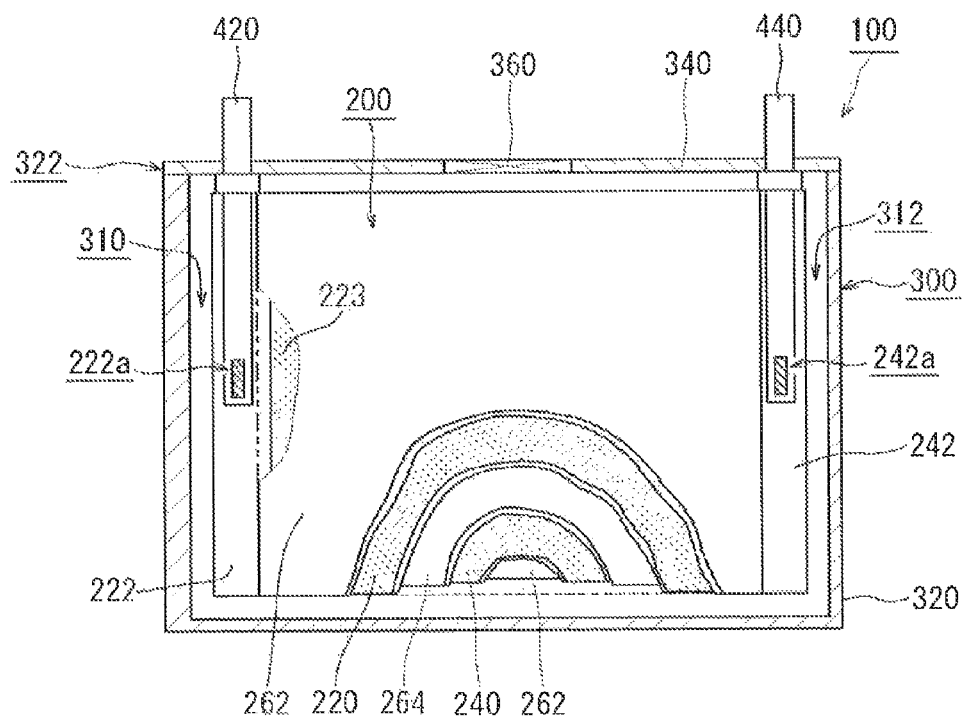
FIG. 1 is a diagram showing an example of a structure of a lithium-ion secondary battery.

Hereinafter, a secondary battery according to an embodiment of the present invention will be described with reference to the drawings. Members and portions that produce same effects are denoted by same reference characters whenever appropriate. In addition, it will be recognized that the respective drawings are merely schematic renderings and therefore are not necessarily actual reflections of the elements shown. First, an example of a structure of a lithium-ion secondary battery will be described as an example of the secondary battery of the present invention. Subsequently, a positive electrode mixture layer and a negative electrode mixture layer of a lithium-ion secondary battery will be described. Finally, an evaluation test of a lithium-ion secondary battery will be described.

Figure 2:
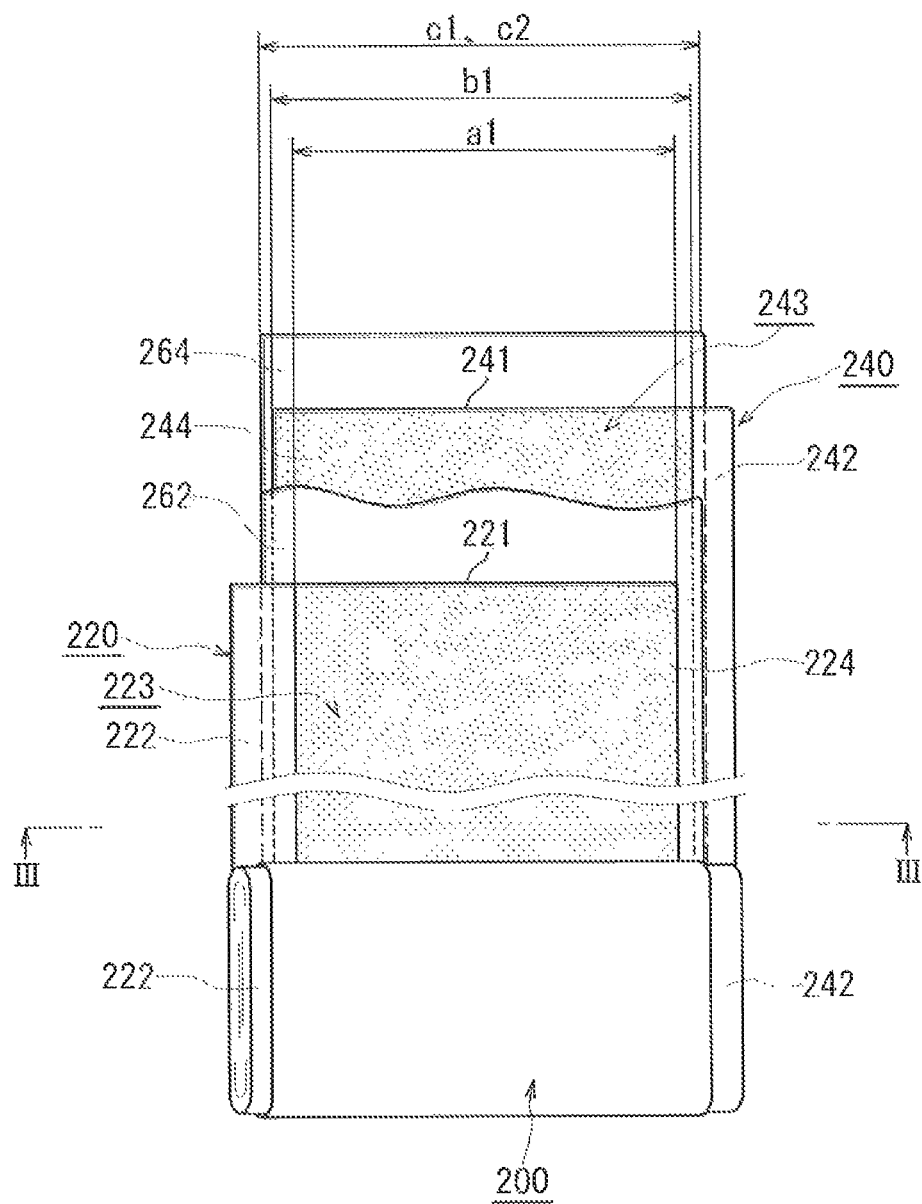
FIG. 2 is a diagram showing a wound electrode body of a lithium-ion secondary battery.
Figure 3:
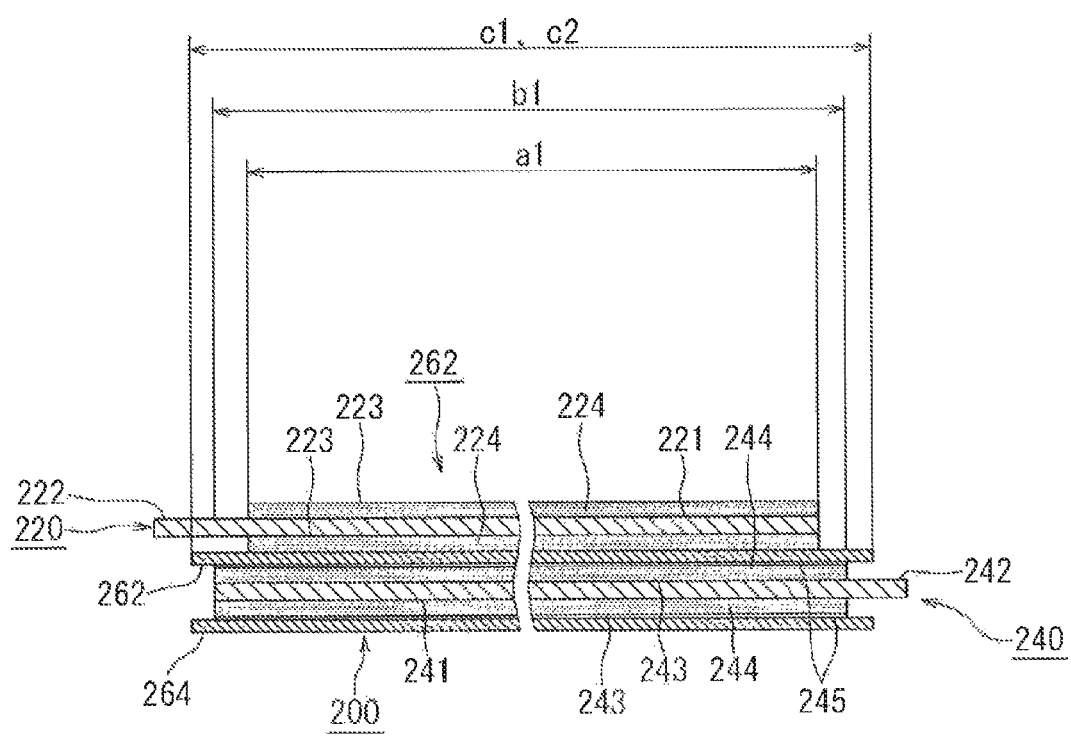
FIG. 3 shows a cross-section taken along line III-III in FIG. 2.

FIG. 1 shows a lithium-ion secondary battery 100. As shown in FIG. 1, the lithium-ion secondary battery 100 comprises a wound electrode body 200 and a battery case 300. Furthermore, FIG. 2 is a diagram showing the wound electrode body 200. FIG. 3 shows a cross-section taken along line III-III in FIG. 2.

As shown in FIG. 2, the wound electrode body 200 comprises a positive electrode sheet 220, a negative electrode sheet 240, and separators 262 and 264. The positive electrode sheet 220, the negative electrode sheet 240, and the separators 262 and 264 are respectively band-like sheet materials.

<Positive Electrode Sheet 220>

As shown in FIG. 2, the positive electrode sheet 220 comprises a band-like positive electrode current collector 221 (positive electrode core). A metallic foil suitable for a positive electrode may be preferably used as the positive electrode current collector 221. A band-like aluminum foil having a predetermined width is used as the positive electrode current collector 221. In addition, the positive electrode sheet 220 comprises an uncoated portion 222 and a positive electrode mixture layer 223. The uncoated portion 222 is set along one width-direction edge of the positive electrode current collector 221. The positive electrode mixture layer 223 is a layer coated with a positive electrode mixture 224 containing a positive electrode active material. With the exception of the uncoated portion 222 set on the positive electrode current collector 221, the positive electrode mixture 224 coats both surfaces of the positive electrode current collector 221.

<Positive Electrode Mixture 224, Positive Electrode Active Material>

In this case, the positive electrode mixture 224 is a mixture of a positive electrode active material, an electrically conductive material, a binder, and the like. A material used as a positive electrode active material of a lithium-ion secondary battery can be used as the positive electrode active material. Examples of a positive electrode active material include lithium transition metal oxides such as $LiNiCoMnO_2$ (lithium-nickel-cobalt-manganese complex oxide), $LiNiO_2$ (lithium nickelate), $LiCoO_2$ (lithium cobaltate), $LiMn_2O_4$ (lithium manganate), and $LiFePO_4$ (iron lithium phosphate). For example, $LiMn_2O_4$ has a spinel structure. In addition, $LiNiO_2$ and $LiCoO_2$ have a layered evaporitic structure. Furthermore, for example, $LiFePO_4$ has an olivine structure. $LiFePO_4$ having an olivine structure includes, for example, particles in the order of nanometers. In addition, $LiFePO_4$ having an olivine structure can be further coated by a carbon film.

<Electrically Conductive Material>

The positive electrode mixture 224 may contain the positive electrode active material as well as other arbitrary components such as an electrically conductive material or a binder as necessary. Examples of the electrically conductive material include carbon materials such as carbon powders and carbon fibers. One type of material selected from such electrically conductive materials may be used alone or two or more types may be used in combination. Examples of carbon powders that can be used include various types of carbon black (such as acetylene black, oil furnace black, graphitized carbon black, carbon black, graphite, and Ketjen black) and graphite powder.

<Binder, Thickener, and Solvent>

For the binder, a polymer can be used which is dispersible or dissolvable in the solvent used. For example, in a positive electrode mixture composition that uses an aqueous solvent, a water-soluble or water-dispersible polymer can be used favorably, examples of which include: cellulose-based polymers (for example, polyvinyl alcohol (PVA) and polytetrafluoroethylene (PTFE)) such as carboxymethyl cellulose (CMC) or hydroxypropyl methyl cellulose (HPMC); fluorine-based resins (for example, a vinyl acetate copolymer and styrene butadiene rubber (SBR)) such as tetrafluoroethylene-hexafluoropropylene copolymer (FEP); and rubbers such as an acrylic acid-modified SBR resin (SBR latex). In addition, in a positive electrode mixture composition that uses a non-aqueous solvent, polymers such as polyvinylidene fluoride (PVDF) or polyvinylidene chloride (PVDC) can be used favorably. In addition to functioning as a binder, the above-mentioned examples of polymer materials can also be used for the purpose of demonstrating a function as a thickener or other additives in the above-mentioned composition. Any aqueous solvent or non-aqueous solvent can be used as the solvent. A preferable example of a non-aqueous solvent is N-methyl-2-pyrrolidone (NMP).

A weight ratio of the positive electrode active material in the entire positive electrode mixture is favorably approximately 50% by weight or more (and typically 50 to 95% by weight), and normally the ratio is more favorably approximately 70 to 95% by weight (for example, 75 to 90% by weight). In addition, the ratio of the electrically conductive material in the entire positive electrode mixture can favorably be, for example, approximately 2 to 20% by weight, and normally the ratio is favorably approximately 2 to 15% by weight. In a composition that uses a binder, the ratio of the binder in the entire positive electrode mixture can be, for example, approximately 1 to 10% by weight, and normally the ratio is favorably approximately 2 to 5% by weight.

<Negative Electrode Sheet 240>

As shown in FIG. 2, the negative electrode sheet 240 comprises a band-like negative electrode current collector 241 (negative electrode core). A metallic foil suitable for a negative electrode may be preferably used as the negative electrode current collector 241. In the present embodiment, a band-like copper foil having a predetermined width is used as the negative electrode current collector 241. In addition, the negative electrode sheet 240 comprises an uncoated portion 242 and a negative electrode mixture layer 243. The uncoated portion 242 is set along one width-direction edge of the negative electrode current collector 241. The negative electrode mixture layer 243 is a layer coated with a negative electrode mixture 244 containing a negative electrode active material. With the exception of the uncoated portion 242 set on the negative electrode current collector 241, the negative electrode mixture 244 coats both surfaces of the negative electrode current collector 241.

<Negative Electrode Mixture 244>

In this case, the negative electrode mixture 244 is a mixture of a negative electrode active material, a thickener, a binder, and the like. A material used as a negative electrode active material of a lithium-ion secondary battery can be used as the negative electrode active material. Examples of a negative electrode active material include carbon-based materials such as natural graphite, artificial graphite, and an amorphous carbon of natural graphite or artificial graphite, lithium transition metal oxide, and lithium transition metal nitride. Moreover, a negative electrode active material is itself electrically conductive. Therefore, an electrically conductive material is added to the negative electrode mixture 244 when necessary. In addition, in this example, a heat-resistant layer (HRL) 245 is further formed on a surface of the negative electrode mixture layer 243 as shown in FIG. 3. The heat-resistant layer 245 is mainly formed of a metal oxide (for example, alumina). Moreover, in this lithium-ion secondary battery 100, the heat-resistant layer 245 is formed on a surface of the negative electrode mixture layer 243. Although not shown, for example, a heat-resistant layer may be formed on surfaces of the separators 262 and 264.

<Negative Electrode Active Material>

Furthermore, one type or two or more types of materials conventionally used in lithium-ion secondary batteries can be used without particular limitation for the negative electrode active material. Examples of these materials include particulate carbon materials (carbon powder) containing a graphite structure (a layered structure) in at least a portion thereof. More specifically, carbon materials having a so-called graphitic structure (graphite), a non-graphitizable carbonaceous structure (hard carbon), a graphitizable carbonaceous structure (soft carbon), or a combination thereof can be used. For example, graphite particles such as natural graphite can be used. Moreover, a negative electrode active material obtained by amorphous carbon coating over the surface of natural graphite can be used. Furthermore, an appropriate quantity of a thickener is mixed into the negative electrode mixture in order to maintain dispersion of the negative electrode active material. A thickener, a binder, or an electrically conductive material similar to those used in the positive electrode mixture can be used in the negative electrode mixture.

Although there are no particular limitations thereon, the ratio of the negative electrode active material in the entire negative electrode mixture can be approximately 80% by weight or more (for example, 80 to 99% by weight). Favorably, the ratio of the negative electrode active material in the entire negative electrode mixture is approximately 90% by weight or more (for example, 90 to 99% by weight, and more favorably, 95 to 99% by weight). In a composition that uses a binder, the ratio of the binder in the entire negative electrode mixture can be, for example, approximately 0.5 to 10% by weight, and normally the ratio is favorably approximately 1 to 5% by weight. The positive electrode mixture layer 223 and the negative electrode mixture layer 243 are respectively formed by being coated onto the positive electrode current collector 221 or the negative electrode current collector 241 and by being subsequently subjected to drying and rolling.

<Coating of Mixture>

In the coating step, the positive electrode mixture 224 or the negative electrode mixture 244 is coated onto a sheet-shaped current collector. A conventionally known suitable coating device such as a slit coater, a die coater, a comma coater or a gravure coater can be used for the coating step. In this case, by using an elongated band-like sheet-shaped current collector, the positive electrode mixture 224 or the negative electrode mixture 244 can be continuously coated on the current collector.

<Drying Step>

In the drying step, the positive electrode mixture or the negative electrode mixture coated on the sheet-shaped current collector is dried. When doing so, suitable drying conditions may be set in order to prevent migration. In this case, by using an elongated band-like sheet-shaped current collector and passing the current collector along a guideway provided inside a drying oven, the positive electrode mixture 224 or the negative electrode mixture 244 coated on the current collector can be continuously dried.

<Rolling Step>

Furthermore, in the rolling step, the positive electrode mixture layer 223 or the negative electrode mixture layer 243 dried in the drying step is pressed in a thickness direction to obtain a sheet-shaped positive electrode (positive electrode sheet) having target physical properties. Examples of methods that can be suitably used to carry out the pressing described above include conventionally known roll pressing methods and plate pressing methods.

<Separators 262 and 264>

The separators 262 and 264 are members that separate the positive electrode sheet 220 and the negative electrode sheet 240 from each other. In this example, the separators 262 and 264 are constituted by band-like sheet members with a predetermined width which have a plurality of minute holes. For example, a separator made of a porous polyolefin-based resin and having a single-layer structure or a laminated structure may be used as the separators 262 and 264. In this example, as shown in FIGS. 2 and 3, a width b1 of the negative electrode mixture layer 243 is slightly wider than a width a1 of the positive electrode mixture layer 223. Furthermore, widths c1 and c2 of the separators 262 and 264 are slightly wider than the width b1 of the negative electrode mixture layer 243 (c1, c2>b1>a1).

<Wound Electrode Body 200>

The positive electrode sheet 220 and the negative electrode sheet 240 of the wound electrode body 200 are laminated and wound with the separators 262 and 264 interposed between the positive electrode sheet 220 and the negative electrode sheet 240.

In this example, as shown in FIG. 2, the positive electrode sheet 220, the negative electrode sheet 240, and the separators 262 and 264 are laminated with their lengthwise directions aligned in an order of: the positive electrode sheet 220, the separator 262, the negative electrode sheet 240, and the separator 264. In doing so, the separators 262 and 264 are laminated onto the positive electrode mixture layer 223 and the negative electrode mixture layer 243. Furthermore, the width of the negative electrode mixture layer 243 is slightly wider than that of the positive electrode mixture layer 223 and the negative electrode mixture layer 243 is laminated so as to cover the positive electrode mixture layer 223. Accordingly, lithium ions (Li) can migrate more reliably between the positive electrode mixture layer 223 and the negative electrode mixture layer 243 during charging and discharging.

In addition, an uncoated portion 222 of the positive electrode sheet 220 and an uncoated portion 242 of the negative electrode sheet 240 are laminated so as to mutually protrude toward opposite sides in the width direction of the separators 262 and 264. The laminated sheet material (for example, the positive electrode sheet 220) is wound around a winding axis set in the width direction.

Moreover, with the wound electrode body 200, the positive electrode sheet 220, the negative electrode sheet 240, and the separators 262 and 264 are wound laminated in a predetermined order. In this process, the respective sheets are laminated while controlling positions thereof using a positioning mechanism such as EPC (edge position control). In doing so, the negative electrode mixture layer 243 is laminated so as to cover the positive electrode mixture layer 223 albeit in a state where the separators 262 and 264 are interposed between the negative electrode mixture layer 243 and the positive electrode mixture layer 223.

<Battery Case 300>

Furthermore, in this example, as shown in FIG. 1, the battery case 300 is a so-called square battery case and comprises a container main body 320 and a lid 340. The container main body 320 has a bottomed square tube shape and is a flat box-shaped container with one side surface (upper surface) opened. The lid 340 is a member which is attached to the opening (upper surface opening) of the container main body 320 and which blocks the opening.

With a vehicle-mounted secondary battery, weight energy efficiency (capacity of battery per unit weight) is desirably improved in order to improve fuel efficiency. Therefore, a light-weight metal such as aluminum or an aluminum alloy (in this example, aluminum) is adopted as the container main body 320 and the lid 340 constituting the battery case 300. Accordingly, weight energy efficiency can be improved.

The battery case 300 has a flat rectangular inner space as a space for housing the wound electrode body 200. In addition, as shown in FIG. 1, a width of the flat inner space of the battery case 300 is slightly greater than the wound electrode body 200. In the present embodiment, the wound electrode body 200 is housed in the inner space of the battery case 300. As shown in FIG. 1, the wound electrode body 200 is housed in the battery case 300 in a state where the wound electrode body 200 is flatly deformed in one direction that is perpendicular to the winding axis.

In the present embodiment, the battery case 300 comprises the container main body 320 having a bottomed square tube shape and the lid 340 that blocks the opening of the container main body 320. In this case, for example, the container main body 320 may be molded by deep-draw molding or impact molding. Impact molding is a type of cold forging and is also referred to as impact extruding and impact pressing.

Furthermore, electrode terminals 420 and 440 are attached to the lid 340 of the battery case 300. The electrode terminals 420 and 440 penetrate the battery case 300 (the lid 340) and reach the outside of the battery case 300. Moreover, a safety valve 360 is provided on the lid 340.

In this example, the wound electrode body 200 is attached to the electrode terminals 420 and 440 which are attached to the battery case 300 (in this example, the lid 340). The wound electrode body 200 is housed in the battery case 300 in a state where the wound electrode body 200 is flatly deformed in one direction that is perpendicular to the winding axis. In addition, in the wound electrode body 200, the uncoated portion 222 of the positive electrode sheet 220 and the uncoated portion 242 of the negative electrode sheet 240 mutually protrude toward opposite sides in the width direction of the separators 262 and 264. Among the electrode terminals, one electrode terminal 420 is fixed to the uncoated portion 222 of the positive electrode current collector 221 and the other electrode terminal 440 is fixed to the uncoated portion 242 of the negative electrode current collector 241.

Figure 4:
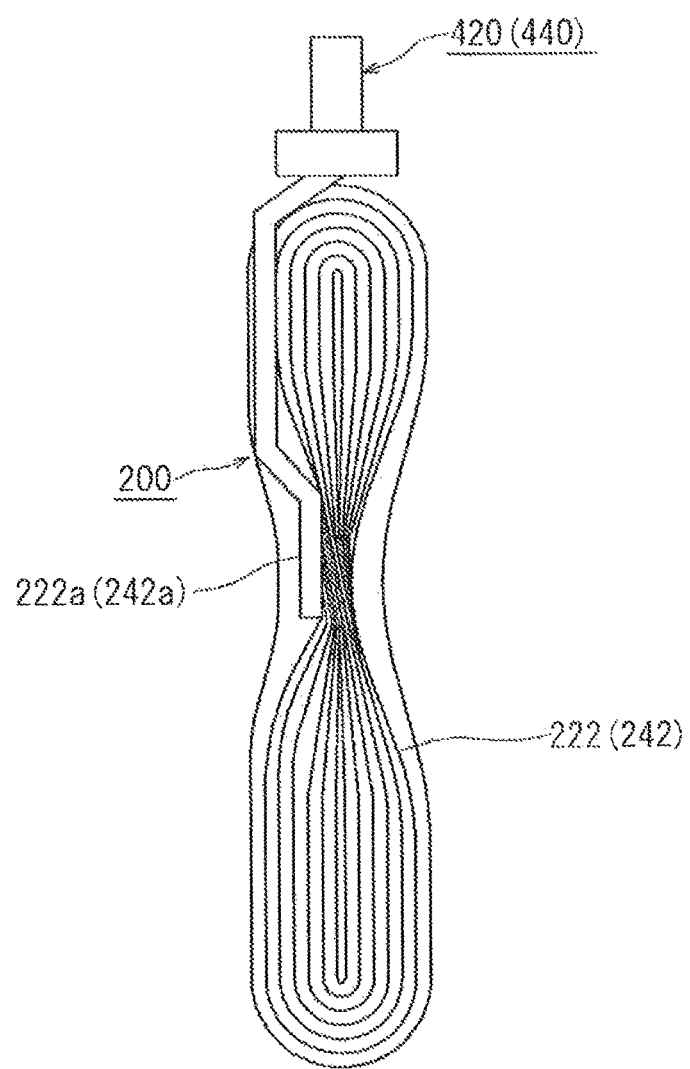
FIG. 4 is a side view showing a welding location of an uncoated portion and an electrode terminal of a wound electrode body.

In addition, in this example, as shown in FIG. 1, the electrode terminals 420 and 440 of the lid 340 extend to intermediate portions 222a and 242a of the uncoated portions 222 and 242 of the wound electrode body 200. Tips of the electrode terminals 420 and 440 are welded to the respective intermediate portions 222a and 242a of the uncoated portions 222 and 242. FIG. 4 is a side view showing a welding location of the uncoated portions 222 and 242 and the electrode terminals 420 and 440 of the wound electrode body 200.

As shown in FIG. 4, on both sides of the separators 262 and 264, the uncoated portion 222 of the positive electrode current collector 221 and the uncoated portion 242 of the negative electrode current collector 241 are spirally exposed. In the present embodiment, the uncoated portions 222 and 242 are respectively assembled at the intermediate portions 222a and 242a thereof and are welded to the tips of the electrode terminals 420 and 440. When doing so, due to differences in the respective materials, for example, ultrasonic welding is used to weld the electrode terminal 420 and the positive electrode current collector 221 to each other. In addition, for example, resistance welding is used to weld the electrode terminal 440 and the negative electrode current collector 241 to each other.

As described above, the wound electrode body 200 is attached to the electrode terminals 420 and 440 fixed to the lid 340 in a state where the wound electrode body 200 is pressed and bent flat. This wound electrode body 200 is housed in the flat inner space of the container main body 320. After the wound electrode body 200 is housed, the container main body 320 is blocked by the lid 340. A joint 322 (refer to FIG. 1) of the lid 340 and the container main body 320 is welded and sealed by, for example, laser welding. As described above, in this example, the wound electrode body 200 is positioned inside the battery case 300 by the electrode terminals 420 and 440 fixed to the lid 340 (the battery case 300).

<Electrolyte Solution>

Subsequently, an electrolyte solution is injected into the battery case 300 from an inlet provided on the lid 340. As the electrolyte solution, in the example, an electrolyte solution in which $LiPF_6$ is contained at a concentration of approximately 1 mol/liter in a mixed solvent of ethylene carbonate and diethyl carbonate (for example, a mixed solvent with a volume ratio of around 1:1) is used. Subsequently, a metallic sealing cap is attached (for example, by welding) to the inlet to seal the battery case 300. Moreover, as the electrolyte solution, a non-aqueous electrolyte solution conventionally used in a lithium-ion secondary battery can be used.

<Outgassing Path>

In addition, in this example, the flat inner space of the battery case 300 is slightly wider than the flatly-deformed wound electrode body 200. Gaps 310 and 312 are provided on both sides of the wound electrode body 200 between the wound electrode body 200 and the battery case 300. The gaps 310 and 312 act as outgassing paths.

With the lithium-ion secondary battery 100 configured as described above, temperature rises when an overcharge occurs. When the temperature of the lithium-ion secondary battery 100 rises, the electrolyte solution is decomposed and a gas is generated. The generated gas passes through the gaps 310 and 312 on both sides of the wound electrode body 200 between the wound electrode body 200 and the battery case 300 and through the safety valve 360, and is smoothly discharged to the outside. In this lithium-ion secondary battery 100, the positive electrode current collector 221 and the negative electrode current collector 241 are electrically connected to an external device through the electrode terminals 420 and 440 which penetrate the battery case 300.

<Other Battery Modes>

Moreover, the above description represents an example of a lithium-ion secondary battery. However, lithium-ion secondary batteries are not limited to the mode described above. Similarly, an electrode sheet obtained by coating a metallic foil with an electrode mixture may be used in various other battery modes. For example, a cylindrical battery and a laminated battery are known as other battery modes. A cylindrical battery is a battery in which a wound electrode body is housed in a cylindrical battery case. In addition, a laminated battery is a battery in which a positive electrode sheet and a negative electrode sheet are laminated with a separator interposed between the positive electrode sheet and the negative electrode sheet. Moreover, while the lithium-ion secondary battery 100 is exemplified above, secondary batteries other than a lithium-ion secondary battery may also adopt similar structures.

<Positive Electrode Mixture Layer 223>

Figure 5:
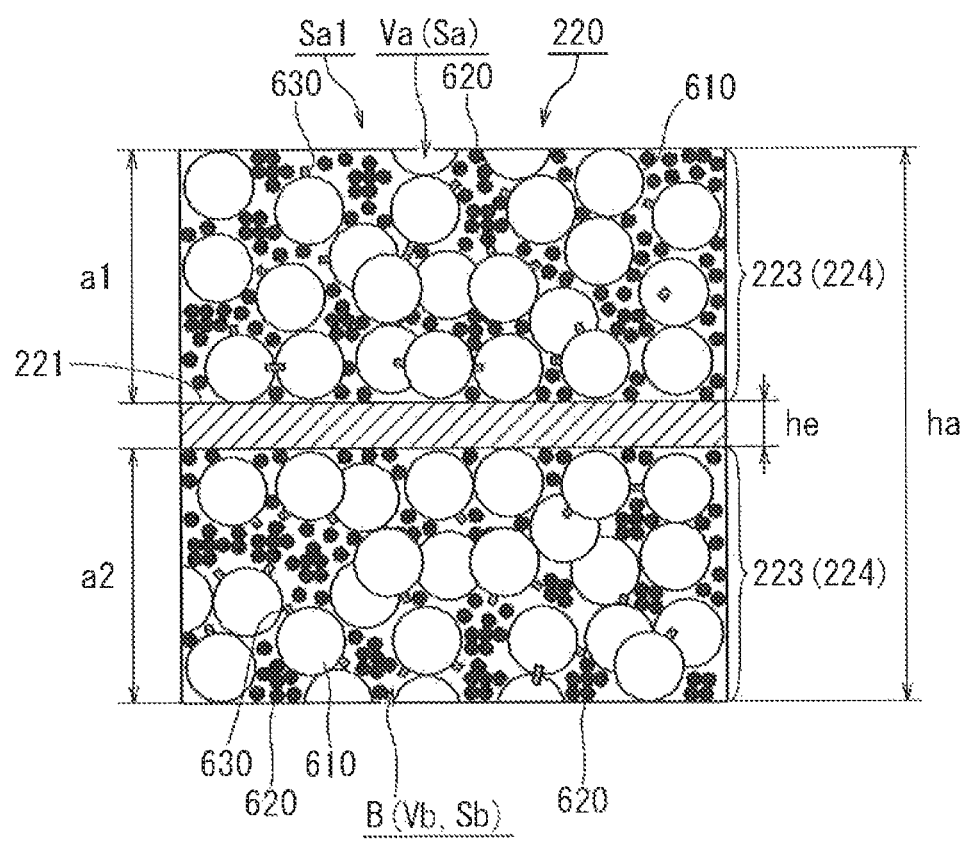
FIG. 5 is a sectional view showing a structure of a positive electrode mixture layer.

FIG. 5 is a sectional view of the positive electrode sheet 220 of the lithium-ion secondary battery 100. In the present embodiment, both surfaces of the positive electrode current collector 221 are respectively coated by the positive electrode mixture 224 as shown in FIG. 5. This layer of the positive electrode mixture 224 (the positive electrode mixture layer 223) contains a positive electrode active material 610, and an electrically conductive material 620. In this embodiment, the positive electrode mixture layer 223 further contains a binder (a binding agent) 630. Moreover, in FIG. 5, the positive electrode active material 610, the electrically conductive material 620, and the binder 630 in the positive electrode mixture layer 223 are schematically depicted enlarged so as to clarify the structure of the positive electrode mixture layer 223.

<Positive Electrode Active Material 610>

In this case, the positive electrode active material 610 is constituted by secondary particles formed by the aggregation of a plurality of primary particles (not shown) of a lithium transition metal oxide. The secondary particles have a particle diameter ranging from approximately 3 μm to 12 μm and more favorably from approximately 3 μm to 8 μm. Here, a median diameter (d50) obtained from a particle size distribution measured by a laser diffractive scattering particle size distribution analyzer is adopted as the particle diameter. For example, LA-920 manufactured by HORIBA, Ltd. can be used as the laser diffractive scattering particle size distribution analyzer. Hereinafter, unless specifically mentioned otherwise, the term "positive electrode active material 610" shall signify secondary particles. In addition, particles that enable aggregation of a plurality of primary particles (not shown) to form secondary particles are favorably used as the positive electrode active material 610. A preferable example of the positive electrode active material 610 favorably contains a lithium-nickel-cobalt-manganese-based complex oxide attributable to a layered structure as a main component. This lithium-nickel-cobalt-manganese-based complex oxide has a hexagonal crystalline system belonging to $\alpha$-$NaFeO_2$ and adopts a layered R3m structure.

<Electrically Conductive Material 620>

In addition, for the electrically conductive material 620, carbon powders such as acetylene black, oil furnace black, graphitized carbon black, carbon black, graphite, Ketjen black, and graphite powder can be used. In this case, one type of a carbon powder or a plurality of types of carbon powder may be mixed at a predetermined ratio for the electrically conductive material 620. Here, the electrically conductive material 620 has a smaller particle diameter than the positive electrode active material 610. For example, the particle diameter of the primary particles of the electrically conductive material 620 ranges from approximately 5 nm to 100 nm and more favorably from approximately 10 nm to 60 nm. Furthermore, a primary structural diameter (which may also be referred to as an aggregate diameter) ranges from approximately 100 nm to 1000 nm and more favorably from approximately 200 nm to 800 nm. A primary structural diameter can be measured using a dynamic scattering particle distribution analyzer. For example, Nanotrac UPA-EX150 manufactured by NIKKISO CO., LTD. can be used as the dynamic scattering particle distribution analyzer.

<Negative Electrode Mixture Layer 243>

Figure 6:
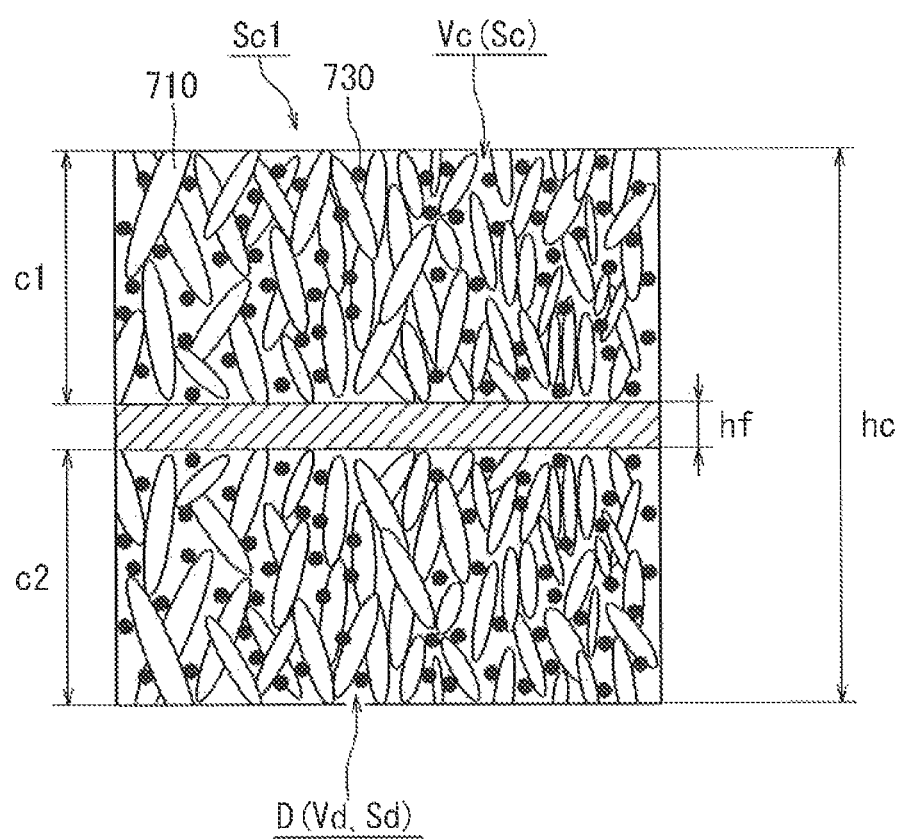
FIG. 6 is a sectional view showing a structure of a negative electrode mixture layer.

In addition, FIG. 6 is a sectional view of the negative electrode sheet 240 of the lithium-ion secondary battery 100. Moreover, in FIG. 6, a negative electrode active material 710 in the negative electrode mixture layer 243 is schematically depicted enlarged so as to clarify the structure of the negative electrode mixture layer 243. Here, a case is shown in which so-called flake graphite is used as the negative electrode active material 710. In the present embodiment, as shown in FIG. 6, both surfaces of the negative electrode current collector 241 are respectively coated by the negative electrode mixture 244. A layer of this negative electrode mixture 244 (the negative electrode mixture layer 243) contains the negative electrode active material 710. In the present embodiment, the negative electrode mixture layer 243 further contains a binder 730. Moreover, negative electrode active materials used in the negative electrode mixture layer 243 are not limited to flake graphite.

<Holes>

The positive electrode mixture layer 223 has minute gaps which may be described as cavities between, for example, particles of the positive electrode active material 610 and particles of the electrically conductive material 620. An electrolyte solution (not shown) penetrates into the minute gaps of the positive electrode mixture layer 223. In addition, the negative electrode mixture layer 243 has minute gaps which may be described as cavities between, for example, particles of the negative electrode active material 710. The electrolyte solution (not shown) penetrates into the minute gaps of the negative electrode mixture layer 243. Furthermore, depending on structures of the positive electrode active material 610 and the negative electrode active material 710, cavities may also exist in the positive electrode active material 610 and the negative electrode active material 710. As described above, there are gaps (cavities) inside the positive electrode mixture layer 223 and the negative electrode mixture layer 243. Here, these gaps (cavities) will be referred to as "holes" when appropriate.

Operations of the secondary battery 100 during charging and discharging will now be described.

<Operation During Charging>

Figure 7:
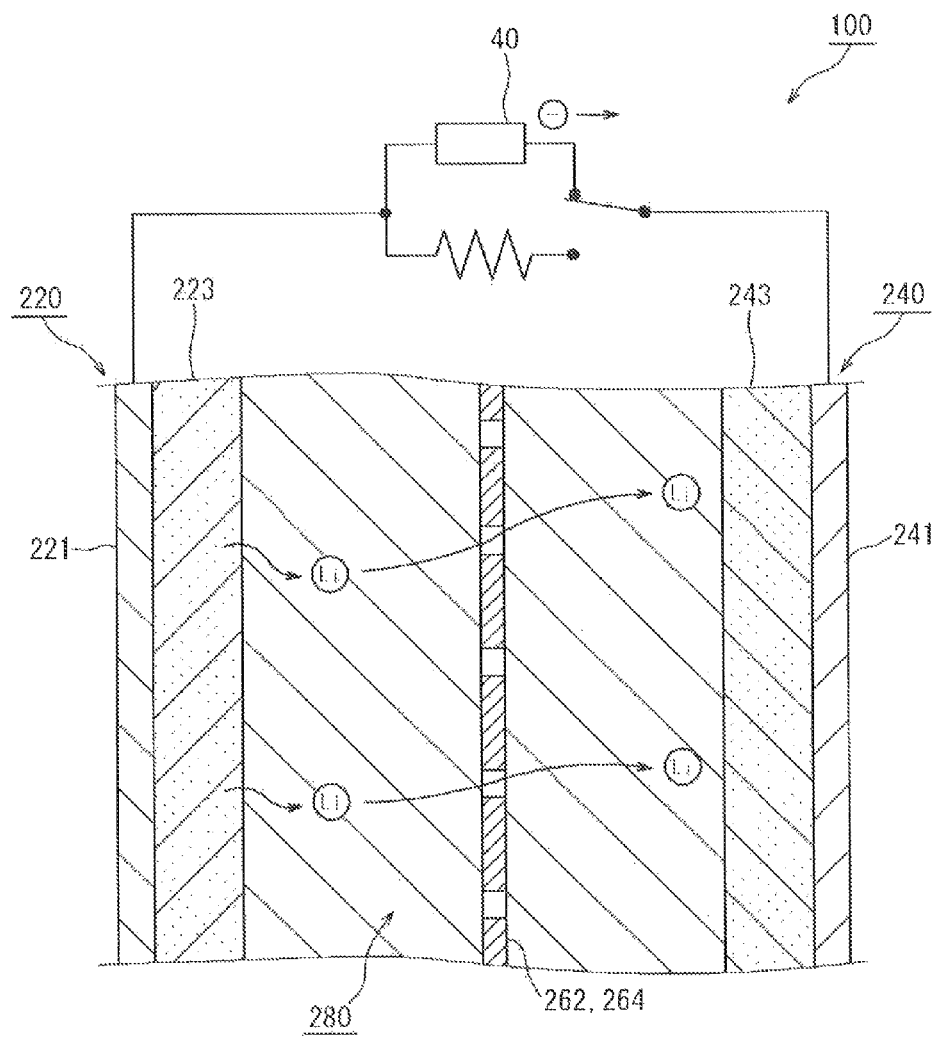
FIG. 7 is a diagram schematically showing a state during charging of a lithium-ion secondary battery.
Figure 14:
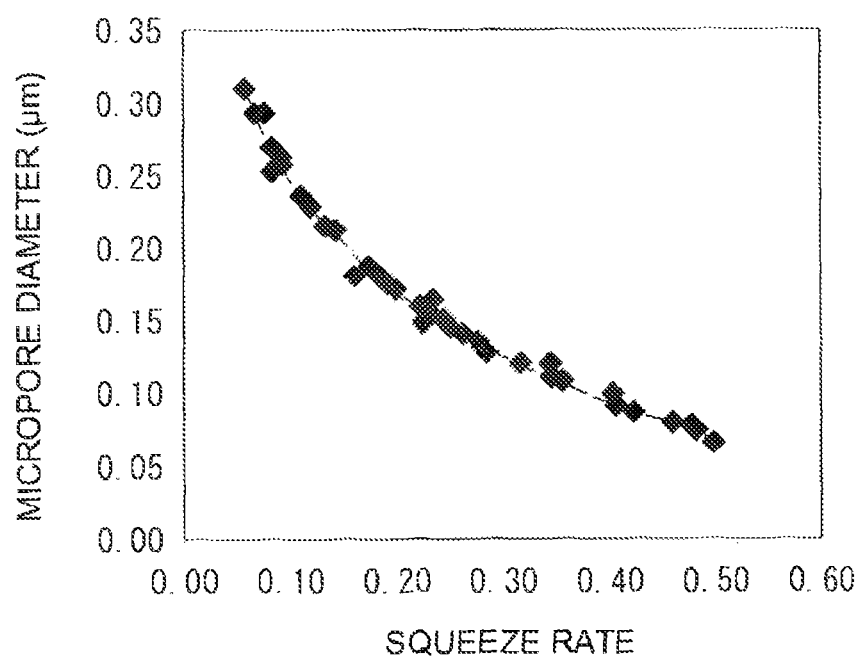
FIG. 14 is a diagram showing a correlation between a squeeze rate X and a micropore diameter D1.

FIG. 14 schematically shows a state of the lithium-ion secondary battery 100 during charging. During charging, as shown in FIG. 14, the electrode terminals 420 and 440 (refer to FIG. 1) of the lithium-ion secondary battery 100 are connected to a charger 40. Due to the effect of the charger 40, during charging, lithium ions (Li) are released from the positive electrode active material 610 (refer to FIG. 5) in the positive electrode mixture layer 223 into the electrolyte solution 280. In addition, electrons are emitted from the positive electrode active material 610 (refer to FIG. 5). As shown in FIG. 7, the emitted electrons are sent to the positive electrode current collector 221 via the electrically conductive material 620, and are further sent to the negative electrode via the charger 40. Meanwhile, at the negative electrode, electrons are stored and, at the same time, the lithium ions (Li) in the electrolyte solution 280 are adsorbed and stored by the negative electrode active material 710 (refer to FIG. 6) in the negative electrode mixture layer 243.

<Operation During Discharging>

Figure 8:
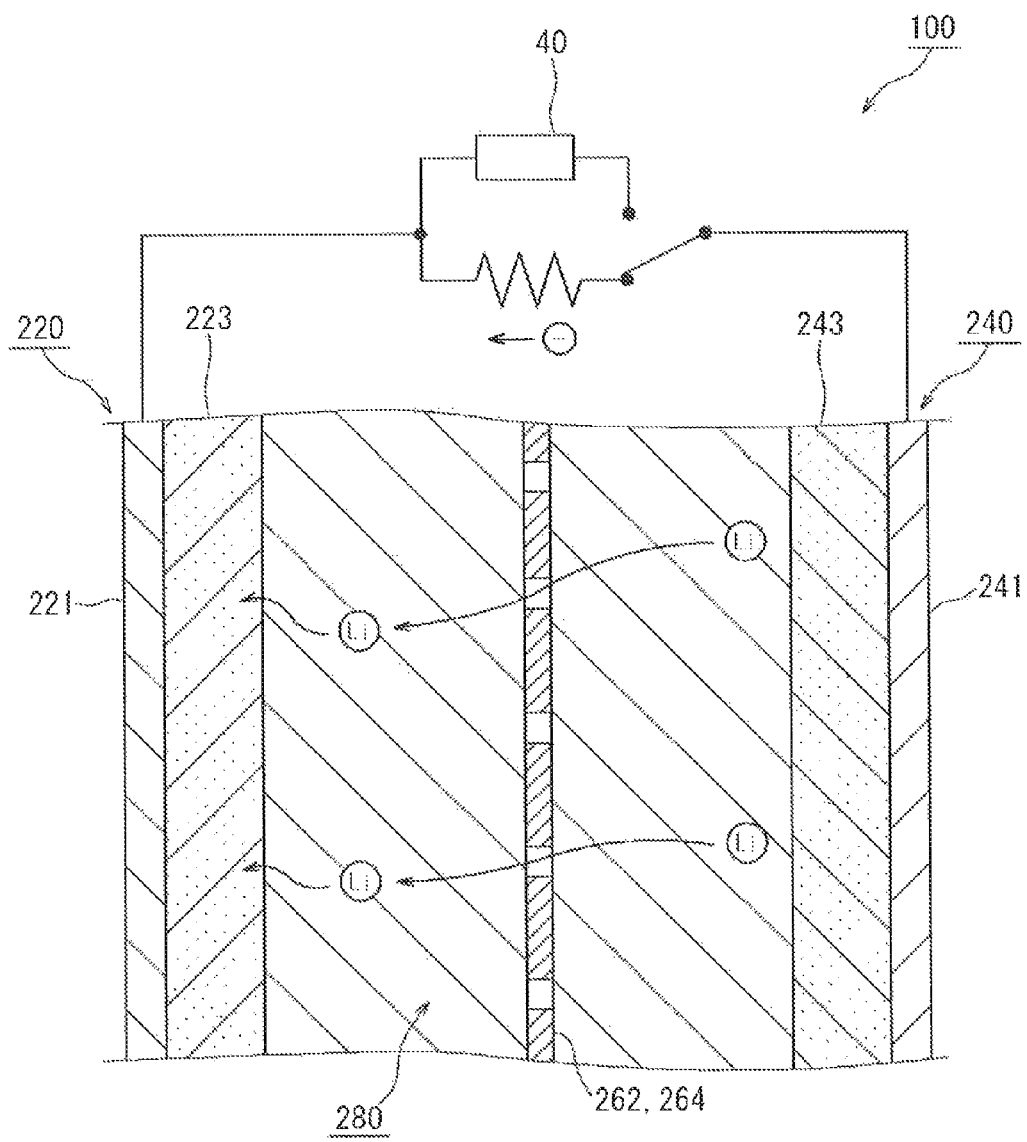
FIG. 8 is a diagram schematically showing a state during discharging of a lithium-ion secondary battery.

FIG. 8 schematically shows a state of the lithium-ion secondary battery 100 during discharging. During discharging, as shown in FIG. 8, electrons are sent from the negative electrode to the positive electrode and lithium ions (Li ions) stored in the negative electrode mixture layer 243 are released to the electrolyte solution 280. In addition, at the positive electrode, the lithium ions (Li) in the electrolyte solution 280 are absorbed by the positive electrode active material 610 in the positive electrode mixture layer 223.

In this manner, during charging and discharging of the secondary battery 100, lithium ions (Li) migrate between the positive electrode mixture layer 223 and the negative electrode mixture layer 243 via the electrolyte solution 280. Therefore, the positive electrode mixture layer 223 desirably has necessary holes that allow the electrolyte solution 280 to penetrate around the positive electrode active material 610 (refer to FIG. 5). In other words, necessary holes are desirably present around the positive electrode active material 610 (refer to FIG. 5) in the positive electrode mixture layer 223 so that lithium ions can diffuse around the positive electrode active material 610 (refer to FIG. 5) in the positive electrode mixture layer 223. Due to this configuration, a sufficient amount of the electrolyte solution can exist around the positive electrode active material 610. Hence, lithium ions (Li) can migrate smoothly between the electrolyte solution 280 and the positive electrode active material 610.

In addition, during charging, electrons are sent from the positive electrode active material 610 to the positive electrode current collector 221 via the electrically conductive material 620. In contrast, during discharging, electrons are returned from the positive electrode current collector 221 to the positive electrode active material 610 via the electrically conductive material 620. In this manner, the positive electrode active material 610 is formed of a lithium transition metal oxide and does not exhibit sufficient conductivity, therefore the transfer of electrons between the positive electrode active material 610 and the positive electrode current collector 221 primarily takes place via the electrically conductive material 620.

As shown, during charging, it is assumed that the smoother the migration of the lithium ions (Li) and the transfer of electrons, the higher the efficiency and the speed of charging that can be performed. In addition, during discharging, it is assumed that the smoother the migration of the lithium ions (Li) and the transfer of electrons, the lower the resistance of the battery and the greater the discharge capacity, which results in improved battery output.

The present inventors focused on porosities of the positive electrode mixture layer 223 and the negative electrode mixture layer 243 and a balance between the porosities as an index for evaluating the secondary battery 100.

<Definition of Porosity>

In this case, "porosity" refers to a ratio of holes in the positive electrode mixture layer 223 or the negative electrode mixture layer 243. For example, a "porosity A1 of the positive electrode mixture layer 223" is expressed as a ratio (Vb/Va) of a volume Vb of holes (B) formed inside the positive electrode mixture layer 223 to an apparent volume Va of the positive electrode mixture layer 223. In addition, a "porosity A2 of the negative electrode mixture layer 243" is expressed as a ratio (Vd/Vc) of a volume Vd of holes (D) formed inside the negative electrode mixture layer 243 to an apparent volume Vc of the negative electrode mixture layer 243.

<Obtaining Porosity A1 (Vb/Va) and Porosity A2 (Vd/Vc)>

The porosity A1 (Vb/Va) may be obtained by, for example, dividing the volume Vb of holes contained in the positive electrode mixture layer 223 by the apparent volume Va of the positive electrode mixture layer 223. The porosity A2 (Vd/Vc) may be obtained by dividing the volume Vd of holes contained in the negative electrode mixture layer 243 by the apparent volume Vc of the negative electrode mixture layer 243.

<Measurement Method of Va and Vc>

For example, as shown in FIG. 5, the apparent volume Va of the positive electrode mixture layer 223 can be obtained as a product of a surface area Sa1 of a sample of the positive electrode sheet 220 in a plan view and a thickness a (not shown) of the positive electrode mixture layer 223 (Va=Sa1× a). For example, as shown in FIG. 6, the apparent volume Vc of the negative electrode mixture layer 243 can be obtained as a product of a surface area Sc1 of a sample of the negative electrode sheet 240 in a plan view and a thickness c (not shown) of the negative electrode mixture layer 243 (Vc=Sc1×c).

In the present embodiment, the positive electrode mixture layer 223 is formed on both surfaces of the positive electrode current collector 221. Therefore, for example, the thickness a of the positive electrode mixture layer 223 can be obtained as a sum of thicknesses a1 and a2 of the positive electrode mixture layer 223 on both surfaces (a=a1+a2). In addition, as another method, the thickness a of the positive electrode mixture layer 223 can be obtained as a difference (ha−he) between a thickness ha of the entire positive electrode sheet 220 and a thickness he of the positive electrode current collector 221 (a=ha−he). Furthermore, the surface area Sa1 of a sample of the positive electrode sheet 220 in a plan view can be readily obtained by, for example, cutting out a square or a rectangle from a sample of the positive electrode sheet 220. In this manner, by obtaining the surface area Sa1 of a sample of the positive electrode sheet 220 in a plan view and the thickness a of the positive electrode mixture layer 223, the apparent volume Va of the positive electrode mixture layer 223 can be obtained.

In addition, in the present embodiment, the negative electrode mixture layer 243 is formed on both surfaces of the negative electrode current collector 241. The thickness c of the negative electrode mixture layer 243 can be obtained as a sum of thicknesses c1 and c2 of the negative electrode mixture layer 243 on both surfaces (c=c1+c2). Alternatively, the thickness c of the negative electrode mixture layer 243 can be obtained as a difference (he−hf) between a thickness he of the entire negative electrode sheet 240 and a thickness hf of the negative electrode current collector 241 (c=he−hf). Furthermore, the surface area Sc1 of a sample of the negative electrode sheet 240 in a plan view can be readily obtained by, for example, cutting out a square or a rectangle from a sample of the positive electrode sheet 220. In this manner, by obtaining the surface area Sc1 of a sample of the negative electrode sheet 240 in a plan view and the thickness c of the negative electrode mixture layer 243, the apparent volume Vc of the negative electrode mixture layer 243 can be obtained.

<Measurement Method of Vb and Vd>

The volume Vb of holes (B) formed inside the positive electrode mixture layer 223 and the volume Vd of holes (D) formed inside the negative electrode mixture layer 243 can be measured using, for example, a mercury porosimeter. Moreover, as far as this measurement method is concerned, a "hole" refers to a hole opened to the outside. According to this method, closed spaces inside the positive electrode mixture layer 223 and the negative electrode mixture layer 243 are not included in "holes". A mercury porosimeter is an instrument for measuring a micropore distribution of a porous body by the mercury intrusion method. For example, AutoPore III 9410 manufactured by Shimadzu Corporation can be used as the mercury porosimeter. When using the mercury porosimeter, for example, by performing measurement within a range of 4 psi to 60,000 psi, a volume distribution of holes corresponding to a micropore range of 50 μm to 0.003 μm can be ascertained.

For example, a plurality of samples are cut out from the positive electrode sheet 220. Next, for the samples, a value of holes B contained in the positive electrode mixture layer 223 is measured using a mercury porosimeter. The mercury porosimeter is an instrument for measuring a micropore distribution of a porous body by the mercury intrusion method. In the mercury intrusion method, first, a sample of the positive electrode sheet 220 is immersed in mercury in a vacuumed state. In this state, as pressure applied to the mercury increases, the mercury gradually penetrates into smaller spaces. Therefore, the size and the volume distribution of holes B in the positive electrode mixture layer 223 can be obtained based on a relationship between an amount of mercury having penetrated into the positive electrode mixture layer 223 and the pressure applied to the mercury. Due to the mercury intrusion method, the volume Vb of the holes B contained in the positive electrode mixture layer 223 can be obtained. The volume Vd of holes D contained in the negative electrode mixture layer 243 can be measured by the mercury intrusion method in a similar manner.

<Calculation of Porosity A1 (Vb/Va) and Porosity A2 (Vd/Vc)>

The porosity A1 (Vb/Va) of the positive electrode mixture layer 223 can be obtained as a ratio of the volume Vb of holes B contained in the positive electrode mixture layer 223, which can be obtained as described above, to the apparent volume Va of the positive electrode mixture layer 223. The porosity A1 (Vb/Va) obtained at this point indicates a volume fraction at which holes penetrable by the electrolyte solution exist in the positive electrode mixture layer 223. In addition, the porosity A2 (Vd/Vc) of the negative electrode mixture layer 243 can be obtained as a ratio (Vd/Vc) of the volume Vd of holes D contained in the negative electrode mixture layer 243, which can be obtained as described above, to the apparent volume Vc of the negative electrode mixture layer 243. The porosity A2 (Vd/Vc) obtained at this point indicates a volume fraction at which holes penetrable by the electrolyte solution exist in the negative electrode mixture layer 243.

There are various other ways to obtain the porosity A1 (Vb/Va) and the porosity A2 (Vd/Vc) described above. Other measurement methods will be exemplified below.

<Another Measurement Method (1) of Porosity A1 (Vb/Va)>

For example, the porosity A1 (Vb/Va) of the positive electrode mixture layer 223 is obtained by the expression below based on measured values of respective components that are measured prior to creating the positive electrode sheet 810.

$$\text{Porosity } A1(Vb/Va)=[(ha-he)-Mv\times\{(\alpha/X)+(\beta/Y)+(\gamma/Z)\}]/(ha-he)$$

In other words, the expression that represents the porosity A1 (Vb/Va) is:

Porosity $A1(Vb/Va)$=[("thickness ha of positive electrode sheet 220"−"thickness he of positive electrode current collector 221")−"coating weight Mv of both surfaces of positive electrode mixture layer 223"×{(weight ratio α of positive electrode active material 610)/(true density X of positive electrode active material 610)+(weight ratio β of electrically conductive material 620)/(true density Y of electrically conductive material 620)+(weight ratio γ of binder 630)/(true density Z of binder 630)}]/("thickness ha of positive electrode sheet 220"−"thickness he of positive electrode current collector 221").

Here, $Mv\times\{(\alpha/X)+(\beta/Y)+(\gamma/Z)\}$ corresponds to a thickness of the positive electrode mixture layer 223 when it is assumed that there are no holes in the positive electrode mixture layer 223.

In addition, for example, the "weight ratio α of the positive electrode active material 610", the "true density X of the positive electrode active material 610", the "weight ratio β of the electrically conductive material 620", the "true density Y of the electrically conductive material 620", the "weight ratio γ of the binder 630", and the "true density Z of the binder 630" can be measured prior to forming the positive electrode mixture layer 223. "True density" can be measured by a density measuring instrument such as a gas displacement pycnometer.

Furthermore, for example, a "thickness (d−e) of the positive electrode mixture layer 223" and the "coating weight My of the positive electrode mixture layer 223" can be measured after forming the positive electrode mixture layer 223. Moreover, the "thickness (d−e) of the positive electrode mixture layer 223" and the "coating weight My of the positive electrode mixture layer 223" can be set as target values in the coating step or the rolling step of the positive electrode mixture layer 223.

In addition, in the present embodiment, as shown in FIG. 5, the positive electrode mixture layer 223 is formed on both surfaces of the positive electrode current collector 221. Therefore, porosity may be calculated in consideration of the positive electrode mixture layer 223 being formed on both surfaces of the positive electrode current collector 221.

<Another Measurement Method (2) of Porosity A1 (Vb/Va)>

The porosity A1 (Vb/Va) of the positive electrode mixture layer 223 can be approximated by yet another method. Another measurement method of the porosity A1 (Vb/Va) will be described below.

A sectional sample of the positive electrode mixture layer 223 may be obtained as, for example, a sectional SEM image. A sectional SEM image is a sectional photograph taken by an electron microscope. For example, an arbitrary section of the positive electrode sheet 220 may be obtained by a CP process (Cross Section Polisher process). For example, a scanning electron microscope (FE-SEM) HITACHI S-4500 manufactured by Hitachi High-Technologies Corporation can be used as the electron microscope. According to sectional SEM images of the positive electrode mixture layer 223, based on differences in tonality and grayscale, a section of component materials of the positive electrode mixture layer 223 and holes B formed inside the positive electrode mixture layer 223 can be determined. Such determination can be performed using image processing techniques.

For example, the porosity A1 (Vb/Va) can be approximated in a sectional sample of the positive electrode mixture layer 223 as a ratio (Sb/Sa) of a surface area Sb occupied by holes B included in a unit sectional area of the positive electrode mixture layer 223 and an apparent sectional area Sa of the positive electrode mixture layer 223. In this case, the ratio (Sb/Sa) may be obtained from a plurality of sectional samples of the positive electrode mixture layer 223. Furthermore, this ratio (Sb/Sa) is approximated in a sectional SEM image by, for example, a ratio (Db/Da) of the number of pixels Db contained in a region determined as being a hole B of the positive electrode mixture layer 223 and the number of pixels Da in a region of the positive electrode mixture layer 223.

In this case, the greater the number of sectional samples of the positive electrode mixture layer 223, the more accurate the approximation of porosity (Vb/Va) by the ratio (Sb/Sa). In this case, for example, sectional samples may be taken along one arbitrary direction of the positive electrode sheet 220 from a plurality of sections perpendicular to the one direction. While a measuring method of the porosity A1 (Vb/Va) of the positive electrode mixture layer 223 has been described, the porosity A2 (Vd/Vc) of the negative electrode mixture layer 243 can be measured based on sectional SEM images in a similar manner.

<Favorable Mode of Positive Electrode Mixture Layer 223 and Negative Electrode Mixture Layer 243>

The present inventors carried out various studies on the porosity A1 of the positive electrode mixture layer 223, the porosity A2 of the negative electrode mixture layer 243, and a balance between the porosities. As a result, findings were made to the effect that a resistance of the secondary battery 100 declines when both the porosity A1 of the positive electrode mixture layer 223 and the porosity A2 of the negative electrode mixture layer 243 are relatively high. In addition, further findings were made to the effect that the porosity A1 of the positive electrode mixture layer 223 and the porosity A2 of the negative electrode mixture layer 243 desirably have a relationship expressed as A1≤A2.

As described above, in order to improve output of a secondary battery, a structure is favorable which enables the migration of lithium ions (Li) and the transfer of electrons to be performed smoothly. Therefore, as a condition to improving the output of a secondary battery, both the positive electrode mixture layer 223 and the negative electrode mixture layer 243 may have necessary holes that enable an electrolyte solution to penetrate around the positive electrode active material 610 and the negative electrode active material 710. When both the porosity A1 of the positive electrode mixture layer 223 and the porosity A2 of the negative electrode mixture layer 243 are relatively high, a larger amount of the electrolyte solution can penetrate around the positive electrode active material 610 and the negative electrode active material 710. Therefore, a phenomenon in which the electrolyte solution becomes insufficient (a so-called depletion) around the positive electrode active material 610 and the negative electrode active material 710 is less likely to occur. As a result, when both the porosity A1 of the positive electrode mixture layer 223 and the porosity A2 of the negative electrode mixture layer 243 are relatively high, migrations of lithium ions (Li) at the positive electrode and the negative electrode respectively become smoother.

As described above, when both the porosity A1 of the positive electrode mixture layer 223 and the porosity A2 of the negative electrode mixture layer 243 are relatively high, an appropriate amount of the electrolyte solution can penetrate in the positive electrode mixture layer 223 and the negative electrode mixture layer 243. Consequently, lithium ions (Li) can respectively migrate readily between the positive electrode active material 610 and the electrolyte solution and between the negative electrode active material 710 and the electrolyte solution. In addition, electron transfer at the positive electrode mixture layer 223 becomes smoother.

Conversely, when the porosity A1 of the positive electrode mixture layer 223 or the porosity A2 of the negative electrode mixture layer 243 is excessively low, the amount of the electrolyte solution that penetrates in the positive electrode mixture layer 223 or the negative electrode mixture layer 243 declines. Consequently, the migration of lithium ions (Li) between the positive electrode active material 610 and the electrolyte solution or between the negative electrode active material 710 and the electrolyte solution becomes difficult. Therefore, an excessively low porosity A1 of the positive electrode current collector 221 or an excessively low porosity A2 of the negative electrode active material 710 may cause an increase in battery resistance.

In addition, when the porosity A1 of the positive electrode mixture layer 223 is the same, there is a tendency that the higher the porosity A2 of the negative electrode mixture layer 243, the lower the resistance of the secondary battery 100. On the other hand, when the porosity A2 of the negative electrode mixture layer 243 is the same, there is a tendency that the higher the porosity A1 of the positive electrode mixture layer 223, the lower the resistance of the secondary battery 100.

<Magnitudes of Porosity A1 and Porosity A2>

Based on such original reasoning, the present inventors considered that, suitably, magnitudes of both the porosity A1 of the positive electrode mixture layer 223 and the porosity A2 of the negative electrode mixture layer 243 are relatively large (specifically, approximately 0.30≤A1, A2). According to this configuration, the positive electrode mixture layer 223 and the negative electrode mixture layer 243 respectively include holes B and D at predetermined ratios. Due to the holes B and D, large amounts of the electrolyte solution respectively penetrate into the positive electrode mixture layer 223 and the negative electrode mixture layer 243. Consequently, lithium ions (Li ions) can respectively migrate readily between the positive electrode active material 610 and the electrolyte solution and between the negative electrode active material 710 and the electrolyte solution. Migration of the lithium ions (Li ions) occurs smoothly during charging and discharging.

Here, the porosity A1 of the positive electrode mixture layer 223 satisfies 0.30≤A1. The porosity A1 of the positive electrode mixture layer 223 more favorably satisfies 0.33≤A1, even more favorably satisfies 0.38≤A1, and may further satisfy approximately 0.40≤A1. In addition, as shown, there is a tendency that the higher the porosity A1 of the positive electrode mixture layer 223, the more favorable. Although an upper limit is not particularly set, the porosity A1 of the positive electrode mixture layer 223 may have an appropriate and feasible magnitude. Moreover, the porosity A1 of the positive electrode mixture layer 223 may have an appropriate and feasible magnitude and, for example, may be approximately 0.65. Although the porosity A1 of the positive electrode mixture layer 223 may be higher than 0.65, an excessively high porosity A1 of the positive electrode mixture layer 223 may prevent electron pathways from being constructed between the positive electrode active material 610 and the electrically conductive material 620 and may impair current collecting performance. For example, the porosity A1 may be set to 0.65 or lower such as at approximately 0.60 or more favorably at approximately 0.57. Accordingly, since electron pathways can be more reliably constructed between the positive electrode active material 610 and the electrically conductive material 620, a secondary battery with more stable performance can conceivably be obtained.

In addition, the porosity A2 of the negative electrode mixture layer 243 satisfies 0.30≤A2. Here, the porosity A2 of the negative electrode mixture layer 243 may more favorably satisfy 0.33≤A2 and may even more favorably satisfy 0.38≤A2. In addition, as shown, there is a tendency that the higher the porosity A2 of the negative electrode mixture layer 243, the more favorable. Therefore, although an upper limit is not particularly set, the porosity A2 of the negative electrode mixture layer 243 may have an appropriate and feasible magnitude. Consequently, the porosity A2 of the negative electrode mixture layer 243 may have an appropriate and feasible magnitude and, for example, may be approximately 0.60 or may further be approximately 0.65.

<Balance Between Porosity A1 and Porosity A2>

Furthermore, the present inventors found that: if the porosity A1 of the positive electrode mixture layer 223 is the same, a case where the porosity A1 of the positive electrode mixture layer 223 and the porosity A2 of the negative electrode mixture layer 243 are comparable with each other (A1=A2) is more favorable than a case where the porosity A1 of the positive electrode mixture layer 223 is higher than the porosity A2 of the negative electrode mixture layer 243 (A1>A2); and by setting the porosity A2 of the negative electrode mixture layer 243 higher than the porosity A1 of the positive electrode mixture layer 223 (A1<A2), the resistance of the secondary battery can be further suppressed.

The present inventors consider that when the porosity A2 of the negative electrode mixture layer 243 is higher than the porosity A1 of the positive electrode mixture layer 223 (A1<A2), diffusion paths of lithium ions are more sufficiently constructed in the negative electrode mixture layer 243 than in the positive electrode mixture layer 223. Therefore, migration of lithium ions (Li ions) occur smoothly between the negative electrode active material 710 and the electrolyte solution in the negative electrode mixture layer 243. As a result, a rate limitation of diffusion of lithium ions (Li ions) in the secondary battery 100 conversely becomes more dependent on a rate limitation of diffusion of lithium ions (Li ions) in the positive electrode mixture layer 223. In other words, by increasing the porosity A2 of the negative electrode mixture layer 243, the rate limitation of diffusion of lithium ions (Li ions) is regulated toward the positive electrode. Therefore, an effect of an increase in the porosity A1 of the positive electrode mixture layer 223 can be more readily obtained.

The present inventors created a plurality of evaluation test lithium-ion secondary battery samples in which the positive electrode mixture layer 223 and the negative electrode mixture layer 243 differ from each other.

<Evaluation Test Battery>

Figure 9:
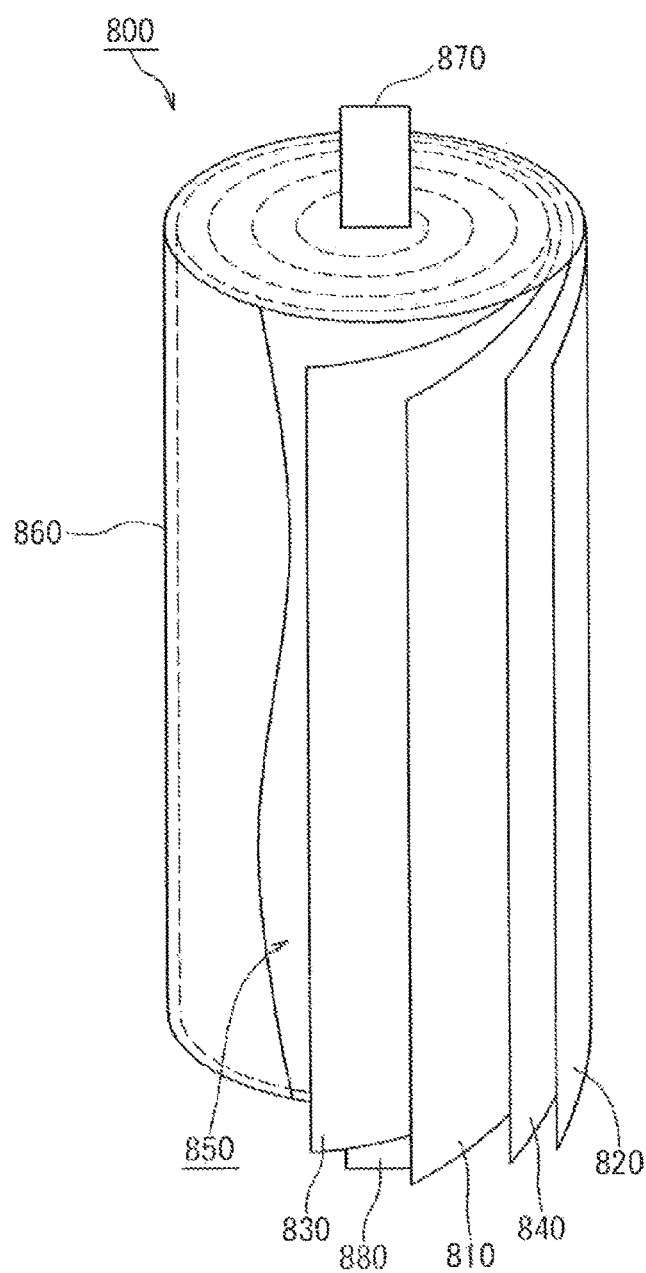
FIG. 9 is a schematic view of an 18650 cell used in an evaluation test.

FIG. 9 schematically shows an evaluation test battery 800. As shown in FIG. 9, the created evaluation test battery 800 is a cylindrical lithium-ion secondary battery commonly referred to as a 18650 cell. Here, the rated capacity of the evaluation test battery 800 was set at about 220 mAh.

For the evaluation test battery 800, as shown in FIG. 9, a positive electrode sheet 810, a negative electrode sheet 820, and two separators 830 and 840 were laminated, and the laminated sheet was wound to fabricate a wound electrode body 850 in which the separators 830 and 840 were interposed between the positive electrode sheet 810 and the negative electrode sheet 820.

In this case, sectional structures of the positive electrode sheet 810 and the negative electrode sheet 820 of the evaluation test battery 800 were approximately similar to the sectional structures of the positive electrode sheet 220 or the negative electrode sheet 240 of the lithium-ion secondary battery 100 (refer to FIG. 1) described earlier. In addition, a porous polyethylene sheet with a thickness of 20 μm was used as the separators 830 and 840. This wound electrode body 850 was housed in an outer case 860 together with a non-aqueous electrolyte solution (not shown) to construct the evaluation test battery 800 (an evaluation test 18650 lithium-ion battery).

Furthermore, for the evaluation test, active material particles having a composition represented by $Li_{1.15}Ni_{0.34}Co_{0.33}Mn_{0.33}O_2$ was used as the positive electrode active material 610. However, the formation process of the active material particles can be elaborated in order to produce secondary particles of the active material particles that are porous or have a hollow form, a near-spherical shape, or shapes that differ from each other. Due to such a difference in structures or due to a difference in average particle diameters in case of a same structure, a difference arises in DBP absorption of the positive electrode active material 610. Here, the average particle diameter (d50) of the secondary particles of the active material particles was set to 3 μm to 12 μm. In addition, for the evaluation test, acetylene black (AB) was used as the electrically conductive material 620. Furthermore, for the evaluation test, N-methyl-2-pyrrolidone (NMP) was used as a solvent. Moreover, polyvinylidene fluoride (PVDF) was used as the binder 630.

In addition, as shown in FIG. 9, the outer case 860 had an approximately cylindrical shape, and electrode terminals 870 and 880 internally connected to the positive electrode sheet 810 and the negative electrode sheet 820 were provided at both side ends of the cylindrical shape. Moreover, as a non-aqueous electrolyte solution for the evaluation test battery

800, a non-aqueous electrolyte solution was used which had a composition obtained by dissolving $LiPF_6$ in a mixed solvent containing EC, DMC and EMC at a volume ratio of 3:3:4 to a concentration of 1 mol/L.

<Conditioning>

Next, a conditioning process, a measurement of rated capacity, and SOC adjustment for the evaluation test batteries constructed as described above will be described in order.

In this case, the conditioning process is performed according to Procedures 1 and 2 below.

Procedure 1: After reaching 4.1 V by charging at a constant current of 1 C, pause for 5 minutes.

Procedure 2: After Procedure 1, charge at a constant voltage for 1.5 hours and subsequently pause for 5 minutes.

<Measurement of Rated Capacity>

Next, after the conditioning process described above, rated capacity of the evaluation test batteries is measured according to Procedures 1 to 3 below at a temperature of 25° C. and within a voltage range of 3.0 V to 4.1 V.

Procedure 1: After reaching 3.0 V by discharging at a constant current of 1 C, discharge at a constant voltage for 2 hours and subsequently pause for 10 seconds.

Procedure 2: After reaching 4.1 V by charging at a constant current of 1 C, charge at a constant voltage for 2.5 hours and subsequently pause for 10 seconds.

Procedure 3: After reaching 3.0 V by discharging at a constant current of 0.5 C, discharge at a constant voltage for 2 hours and subsequently pause for 10 seconds.

Rated capacity: A discharge capacity (CCCV discharge capacity) of discharging from the constant current discharge to the constant voltage discharge in Procedure 3 is adopted as the rated capacity.

<SOC Adjustment>

SOC adjustment is performed on the evaluation test batteries prepared as described above according to Procedures 1 and 2 below under a temperature environment of 25° C. In this case, for example, SOC adjustment may be performed after the conditioning process and the rated capacity measurement described above.

Procedure 1: Charge at a constant current of 1 C from 3V to reach a charged state equivalent to approximately 60% of the rated capacity (SOC 60%). Here, "SOC" refers to State of Charge.

Procedure 2: After Procedure 1, charge at a constant voltage for 2.5 hours.

Accordingly, the evaluation test batteries 800 can be adjusted to a predetermined charged state.

The present inventors prepared evaluation test batteries 800 which only differ from each other in the porosity A1 of the positive electrode mixture layer 223 (refer to FIG. 5) and the porosity A2 of the negative electrode mixture layer 243 (refer to FIG. 6). Subsequently, the present inventors examined how the porosity A1 of the positive electrode mixture layer 223 and the porosity A2 of the negative electrode mixture layer 243 influence the resistance of the secondary battery 100. Moreover, the prepared evaluation test batteries 800 only differ from each other in the porosity A1 of the positive electrode mixture layer 223 and the porosity A2 of the negative electrode mixture layer 243. For example, the same positive electrode active material 610 and the same negative electrode active material 710 were used.

Figure 10:
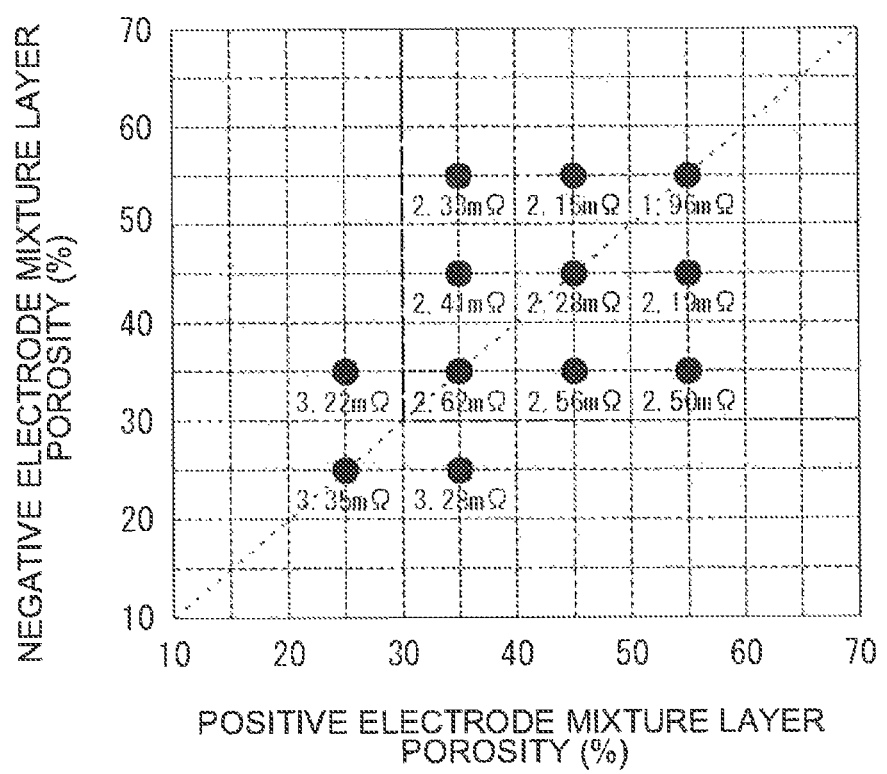
FIG. 10 is a diagram showing a relationship among a porosity A1 of a positive electrode mixture layer, a porosity A2 of a negative electrode mixture layer, and resistance of an evaluation test battery.

FIG. 10 is a diagram showing a relationship among the porosity A1 of the positive electrode mixture layer 223, the porosity A2 of the negative electrode mixture layer 243, and the resistance of the evaluation test batteries 800 (refer to FIGS. 5, 6, and 9). In FIG. 10, an abscissa represents the porosity A1 of the positive electrode mixture layer 223 and an ordinate represents the porosity A2 of the negative electrode mixture layer 243. A resistance value represented by a plot shown in FIG. 10 indicates a resistance of the evaluation test battery 800 having the porosity A1 of the positive electrode mixture layer 223 and the porosity A2 of the negative electrode mixture layer 243 represented by the plot. In this case, a so-called 60 A-10 second resistance is adopted as the resistance of the evaluation test batteries 800.

<60 A-10 Second Resistance>

Here, a 60 A-10 second resistance is calculated for the evaluation test batteries 800 according to the procedures below.

Procedure 1: Perform SOC adjustment to reach a charged state of SOC 60%.

Procedure 2: After Procedure 1, discharge at a constant current of 60 A for 10 seconds, and divide a voltage drop $\Delta V$ that had occurred during the discharge by the discharge current (60 A) to calculate an IV resistance. Adopt the calculated IV resistance as the 60 A-10 second resistance.

Due to the 60 A-10 second resistance, a resistance as well as high-rate output characteristics of the evaluation test batteries 800 can be evaluated.

The test results shown in FIG. 10 are as follows.

1. When the porosity A1 of the positive electrode mixture layer 223 was approximately 0.25 and the porosity A2 of the negative electrode mixture layer 243 was approximately 0.25, the 60 A-10 second resistance of the evaluation test battery 800 was 3.35 mΩ.

2. When the porosity A1 of the positive electrode mixture layer 223 was approximately 0.25 and the porosity A2 of the negative electrode mixture layer 243 was approximately 0.35, the 60 A-10 second resistance of the evaluation test battery 800 was 3.22 mΩ.

3. When the porosity A1 of the positive electrode mixture layer 223 was approximately 0.35 and the porosity A2 of the negative electrode mixture layer 243 was approximately 0.25, the 60 A-10 second resistance of the evaluation test battery 800 was 3.28 mΩ.

4. When the porosity A1 of the positive electrode mixture layer 223 was approximately 0.35 and the porosity A2 of the negative electrode mixture layer 243 was approximately 0.35, the 60 A-10 second resistance of the evaluation test battery 800 was 2.62 mΩ.

5. When the porosity A1 of the positive electrode mixture layer 223 was approximately 0.35 and the porosity A2 of the negative electrode mixture layer 243 was approximately 0.45, the 60 A-10 second resistance of the evaluation test battery 800 was 2.41 mΩ.

6. When the porosity A1 of the positive electrode mixture layer 223 was approximately 0.35 and the porosity A2 of the negative electrode mixture layer 243 was approximately 0.55, the 60 A-10 second resistance of the evaluation test battery 800 was 2.33 mΩ.

7. When the porosity A1 of the positive electrode mixture layer 223 was approximately 0.45 and the porosity A2 of the negative electrode mixture layer 243 was approximately 0.35, the 60 A-10 second resistance of the evaluation test battery 800 was 2.56 mΩ.

8. When the porosity A1 of the positive electrode mixture layer 223 was approximately 0.45 and the porosity A2 of the negative electrode mixture layer 243 was approximately 0.45, the 60 A-10 second resistance of the evaluation test battery 800 was 2.28 mΩ.

9. When the porosity A1 of the positive electrode mixture layer 223 was approximately 0.45 and the porosity A2 of the negative electrode mixture layer 243 was approximately 0.55, the 60 A-10 second resistance of the evaluation test battery 800 was 2.15 mΩ.

10. When the porosity A1 of the positive electrode mixture layer 223 was approximately 0.55 and the porosity A2 of the negative electrode mixture layer 243 was approximately 0.35, the 60 A-10 second resistance of the evaluation test battery 800 was 2.50 mΩ.

11. When the porosity A1 of the positive electrode mixture layer 223 was approximately 0.55 and the porosity A2 of the negative electrode mixture layer 243 was approximately 0.45, the 60 A-10 second resistance of the evaluation test battery 800 was 2.19 mΩ.

12. When the porosity A1 of the positive electrode mixture layer 223 was approximately 0.55 and the porosity A2 of the negative electrode mixture layer 243 was approximately 0.55, the 60 A-10 second resistance of the evaluation test battery 800 was 1.96 mΩ.

As shown, suitably, both the porosity A1 of the positive electrode mixture layer 223 and the porosity A2 of the negative electrode mixture layer 243 are relatively high. Specifically, resistance tends to decline significantly when both the porosity A1 of the positive electrode mixture layer 223 and the porosity A2 of the negative electrode mixture layer 243 are approximately 0.30 or higher (0.30≤A1, A2). In other words, resistance tends to decline more significantly in a case where both the porosity A1 of the positive electrode mixture layer 223 and the porosity A2 of the negative electrode mixture layer 243 are approximately 0.30 or higher (0.30≤A1, A2) than in a case where one of the porosity A1 of the positive electrode mixture layer 223 and the porosity A2 of the negative electrode mixture layer 243 is less than 0.30. In addition, the tendency of resistance to decline is more prominent in a case where the porosity A2 of the negative electrode mixture layer 243 is equal to or higher than the porosity A1 of the positive electrode mixture layer 223 (A1≤A2) than in a case where the porosity A1 of the positive electrode mixture layer 223 is higher than the porosity A2 of the negative electrode mixture layer 243 (A1>A2). More favorably, the resistance of the second battery can be suppressed further when the porosity A2 of the negative electrode mixture layer 243 is higher than the porosity A1 of the positive electrode mixture layer 223.

As shown, the porosity A1 of the positive electrode mixture layer 223 may satisfy 0.30≤A1 and, at the same time, the porosity A2 of the negative electrode mixture layer 243 may satisfy 0.30≤A2. In addition, favorably, the porosity A1 of the positive electrode mixture layer 223 and the porosity A2 of the negative electrode mixture layer 243 satisfy A1≤A2.

When increasing the porosity A1 of the positive electrode mixture layer 223, for example, a density of the positive electrode mixture layer 223 may be reduced. As a consequence of reducing the density of the positive electrode mixture layer 223, a distance between particles of the positive electrode active material 610 may increase and the holes in the positive electrode active material 610 may expand. However, when the holes between particles of the positive electrode active material 610 expand, the electrically conductive material 620 is unable to aggregate successfully and end up being scattered in the positive electrode mixture layer 223. In a state where the electrically conductive material 620 is scattered in the positive electrode mixture layer 223, an appropriate transfer path of electrons is not formed by the electrically conductive material 620 between the positive electrode active material 610 and the positive electrode current collector 221. As a result, an electrical resistance of the positive electrode mixture layer 223 may increase or an amount of dysfunctional positive electrode active material 610 may increase. This may cause a rise in the resistance or a decline in the output of the secondary battery 100.

From the perspective of a structure that enables smooth transfer of electrons, favorably, an adequate amount of the electrically conductive material is contained in the positive electrode mixture layer 223 and, at the same time, an appropriate transfer path of electrons is formed by the electrically conductive material 620 between the positive electrode active material 610 and the positive electrode current collector 221. However, since a primary function of the electrically conductive material 620 is to form a transfer path of electrons, adding an unnecessarily large amount of the electrically conductive material 620 to the positive electrode mixture layer 223 results in an increase in coating weight when a necessary capacity (battery) is set constant. As a result, a weight of the secondary battery 100 increases. In particular, with a vehicle-mounted secondary battery 100, weight reduction and downsizing are required in addition to high output. Therefore, desirably, an appropriate transfer path of electrons is formed in the positive electrode mixture layer 223 while keeping the amount of the electrically conductive material 620 used at a low level.

In consideration thereof, in a micropore distribution of differential micropore volume with respect to micropore diameter as measured by the mercury intrusion method, a first peak at which a micropore diameter D1 satisfies D1≤0.25 μm and a second peak at which a micropore diameter D2 is greater than the micropore diameter D1 at the first peak are set in the positive electrode mixture layer 223. According to such a positive electrode mixture layer 223, the electrically conductive material 620 is densely aggregated in the positive electrode mixture layer 223 and an appropriate transfer path of electrons can be formed in the positive electrode mixture layer 223. Hereinafter, the two peaks (D1 and D2) of the micropore distribution will be described.

<Micropore Distribution>

Figure 11:
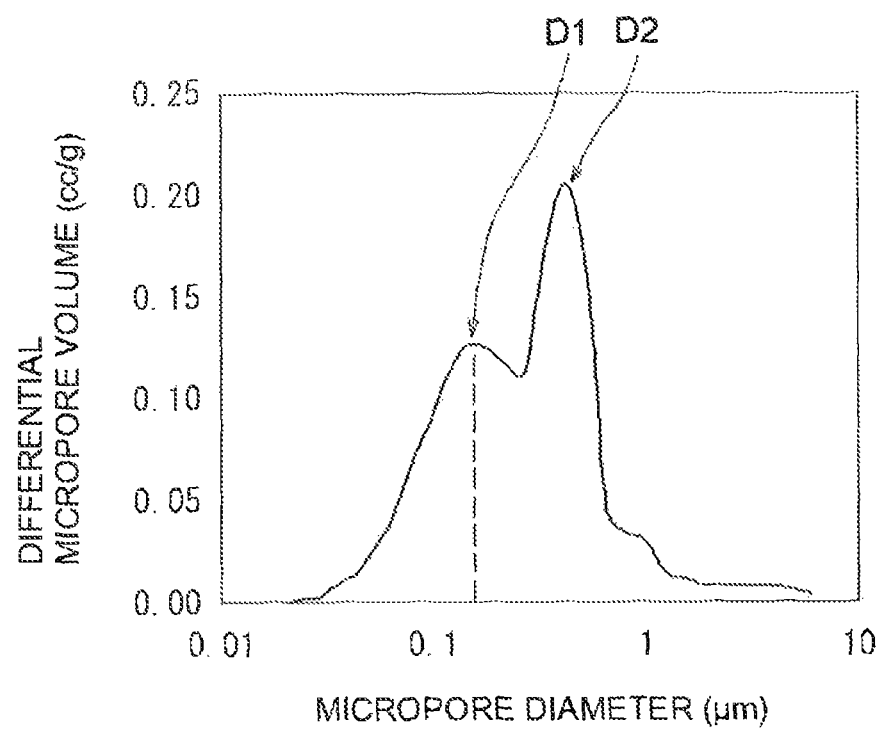
FIG. 11 is a diagram showing an example of a micropore distribution of a positive electrode mixture layer as represented by micropore diameter-differential micropore volume.

The present inventors focused on the micropore distribution of the positive electrode mixture layer 223 ((refer to FIG. 5) as obtained by the mercury intrusion method described earlier. FIG. 11 shows an example of a typical micropore distribution formed inside the positive electrode mixture layer 223. In this case, micropore distribution is expressed as micropore diameter-differential micropore volume. The micropore distribution represents how much holes, whose sizes correspond to the micropore diameter, are contained. As shown in FIG. 11, by expressing a typical micropore distribution of the positive electrode mixture layer 223 as micropore diameter-differential micropore volume, approximately two peaks (D1 and D2) appear in the differential micropore volume. Here, among the two peaks (D1 and D2), the peak D1 with a smaller micropore diameter will be referred to as a first peak and the peak D2 with a larger micropore diameter will be referred to as a second peak.

The present inventors carried out a detailed study on the micropore distribution of the positive electrode mixture layer 223 as obtained by the mercury intrusion method and the two peaks (D1 and D2) described above by, for example, analyzing SEM images of the positive electrode mixture layer 223. As a result, the following findings were made: the micropore diameter D1 of the first peak is mainly attributable to holes in the electrically conductive material 620, and the micropore diameter D2 of the second peak is mainly attributable to holes in the positive electrode active material 610. In addition, the smaller the first peak micropore diameter D1, the smaller the holes in the electrically conductive material 620 and the denser the aggregation of the electrically conductive material 620 and, consequently, an appropriate transfer path of electrons was formed in the positive electrode mixture layer 223. According to the findings of the present inventors, the first peak micropore diameter D1 may be approximately 0.25 μm or less (D1≤0.25 μm). In addition, although a lower limit of the first peak micropore diameter D1 is not particularly set, the first peak micropore diameter D1 may have an appropriate and feasible magnitude. Therefore, the first peak micropore diameter D1 may satisfy, for example, 0.05 μm≤D1.

Hereinafter, an evaluation test on the first peak micropore diameter D1 will be shown. As shown in Table 1, the positive electrode active material 610 and the electrically conductive material 620 with different DBP absorptions were prepared for the evaluation test. In addition, for each sample, a weight ratio of the positive electrode active material 610, the electrically conductive material 620, and the binder 630 contained in the positive electrode mixture 224 was varied. Furthermore, for each sample, the porosity A1 and the first peak micropore diameter D1 of the positive electrode mixture layer 223 were varied.

the positive electrode active material 610, the electrically conductive material 620, and the binder 630 contained in the positive electrode mixture 224 was varied. Furthermore, for each sample, the porosity (Vb/Va) and the first peak micropore diameter D1 were varied. In addition, the negative electrode sheet 240 with a same structure was used for each sample. The porosity A2 of the used negative electrode mixture layer 243 was approximately 0.35.

<DBP Absorption>

DBP absorption is obtained in compliance with JIS K6217-4 "Carbon black for rubber industry—Fundamental characteristics—Part 4: Determination of DBP absorption". Here, DBP (dibutylphthalate) is used as a reagent solution to be titrated using a constant-rate burette onto a test object powder (a powder of secondary particles 910 of the positive electrode active material 610), whereby a variation in viscosity characteristics is measured by a torque detector. Subsequently, an additive amount of the reagent solution per unit weight of the test object powder corresponding to a torque

TABLE 1

| Sample | Squeeze rate X — | Porosity A1 (Vbc/Va) — | First peak micropore diameter D1 μm | DBP absorption Active material mL/100 g | DBP absorption Electrically conductive material mL/100 g | Mixture composition Active material wt % | Mixture composition Electrically conductive material wt % | Mixture composition Binder wt % | 20 C discharge 10-second output (25° C.) W | 20 C discharge cycling resistance increase rate (−15° C.) — |
|---|---|---|---|---|---|---|---|---|---|---|
| 1 | 0.200 | 0.30 | 0.169 | 20.1 | 140 | 87 | 10 | 3 | 37.2 | 1.28 |
| 2 | 0.277 | 0.32 | 0.134 | 22.6 | 140 | 87 | 10 | 3 | 39.1 | 1.21 |
| 3 | 0.246 | 0.35 | 0.150 | 22.6 | 140 | 87 | 10 | 3 | 40.8 | 1.25 |
| 4 | 0.174 | 0.41 | 0.185 | 22.6 | 140 | 87 | 10 | 3 | 41.7 | 1.21 |
| 5 | 0.235 | 0.35 | 0.163 | 24.4 | 140 | 87 | 10 | 3 | 40.7 | 1.20 |
| 6 | 0.161 | 0.41 | 0.180 | 24.4 | 140 | 87 | 10 | 3 | 41.6 | 1.22 |
| 7 | 0.265 | 0.41 | 0.139 | 24.4 | 196 | 87 | 10 | 3 | 42.2 | 1.18 |
| 8 | 0.191 | 0.46 | 0.174 | 24.4 | 196 | 87 | 10 | 3 | 43.4 | 1.16 |
| 9 | 0.317 | 0.35 | 0.119 | 24.4 | 196 | 92.2 | 6 | 1.8 | 40.9 | 1.19 |
| 10 | 0.262 | 0.41 | 0.140 | 24.4 | 196 | 92.2 | 6 | 1.8 | 42.1 | 1.18 |
| 11 | 0.187 | 0.46 | 0.177 | 24.4 | 196 | 92.2 | 6 | 1.8 | 43.2 | 1.15 |
| 12 | 0.345 | 0.32 | 0.110 | 35.2 | 140 | 87 | 10 | 3 | 40.3 | 1.21 |
| 13 | 0.316 | 0.35 | 0.120 | 35.2 | 140 | 87 | 10 | 3 | 41.1 | 1.18 |
| 14 | 0.251 | 0.41 | 0.145 | 35.2 | 140 | 87 | 10 | 3 | 42.1 | 1.17 |
| 15 | 0.176 | 0.46 | 0.183 | 35.2 | 140 | 87 | 10 | 3 | 43.1 | 1.20 |
| 16 | 0.403 | 0.35 | 0.099 | 41.1 | 140 | 87 | 10 | 3 | 41.4 | 1.14 |
| 17 | 0.346 | 0.41 | 0.118 | 41.1 | 140 | 87 | 10 | 3 | 42.4 | 1.12 |
| 18 | 0.223 | 0.49 | 0.157 | 41.1 | 140 | 87 | 10 | 3 | 44.2 | 1.09 |
| 19 | 0.142 | 0.55 | 0.210 | 41.1 | 140 | 87 | 10 | 3 | 49.6 | 1.10 |
| 20 | 0.509 | 0.30 | 0.066 | 41.1 | 196 | 87 | 10 | 3 | 40.1 | 1.15 |
| 21 | 0.496 | 0.32 | 0.069 | 41.1 | 196 | 87 | 10 | 3 | 40.9 | 1.12 |
| 22 | 0.475 | 0.35 | 0.078 | 41.1 | 196 | 87 | 10 | 3 | 41.7 | 1.10 |
| 23 | 0.424 | 0.41 | 0.087 | 41.1 | 196 | 87 | 10 | 3 | 43.5 | 1.08 |
| 24 | 0.316 | 0.49 | 0.119 | 41.1 | 196 | 87 | 10 | 3 | 45.3 | 1.06 |
| 25 | 0.244 | 0.55 | 0.136 | 41.1 | 196 | 87 | 10 | 3 | 50.2 | 1.06 |
| 26 | 0.120 | 0.62 | 0.226 | 41.1 | 196 | 87 | 10 | 3 | 52.1 | 1.04 |
| 27 | 0.459 | 0.35 | 0.078 | 52.1 | 140 | 87 | 10 | 3 | 41.6 | 1.10 |
| 28 | 0.407 | 0.41 | 0.091 | 52.1 | 140 | 87 | 10 | 3 | 42.9 | 1.09 |
| 29 | 0.348 | 0.46 | 0.108 | 52.1 | 140 | 87 | 10 | 3 | 44.1 | 1.07 |
| 30 | 0.222 | 0.55 | 0.158 | 52.1 | 140 | 87 | 10 | 3 | 50.0 | 1.05 |
| 31 | 0.111 | 0.60 | 0.234 | 52.1 | 140 | 87 | 10 | 3 | 51.5 | 1.04 |
| 32 | 0.133 | 0.27 | 0.214 | 14.3 | 75 | 87 | 10 | 3 | 18.5 | 3.25 |
| 33 | 0.067 | 0.32 | 0.290 | 14.3 | 75 | 87 | 10 | 3 | 22.8 | 3.89 |
| 34 | 0.286 | 0.20 | 0.127 | 18.9 | 140 | 87 | 10 | 3 | 10.2 | 3.12 |
| 35 | 0.226 | 0.27 | 0.147 | 18.9 | 140 | 87 | 10 | 3 | 20.1 | 3.32 |
| 36 | 0.083 | 0.38 | 0.250 | 18.9 | 140 | 87 | 10 | 3 | 21.7 | 3.91 |
| 37 | 0.091 | 0.46 | 0.260 | 22.6 | 140 | 87 | 10 | 3 | 22.3 | 4.07 |
| 38 | 0.077 | 0.46 | 0.290 | 24.4 | 140 | 87 | 10 | 3 | 20.2 | 4.13 |
| 39 | 0.082 | 0.52 | 0.267 | 39.1 | 140 | 87 | 10 | 3 | 9.1 | 4.25 |
| 40 | 0.092 | 0.57 | 0.254 | 41.1 | 140 | 87 | 10 | 3 | 9.8 | 4.56 |
| 41 | 0.057 | 0.64 | 0.307 | 41.1 | 190 | 87 | 10 | 3 | 5.2 | 4.87 |

As shown in Table 1, the positive electrode active material 610 and the electrically conductive material 620 respectively having different DBP absorptions were prepared for the evaluation test. In addition, for each sample, a weight ratio of equivalent to 70% of a maximum generated torque is adopted as the DBP absorption (mL/100 g). For example, an absorption tester S410 manufactured by Asahisouken Co., Ltd. may be used as the DBP absorption measuring instrument.

The measurement of the DBP absorption (mL/100 g) of the positive electrode active material 610 was performed by setting 60 g of the active material to the measuring instrument. In addition, the measurement of the DBP absorption (mL/100 g) of the electrically conductive material 620 was performed by setting 15 g of the electrically conductive material 620 to the measuring instrument.

<Porosity A1 of Positive Electrode Active Material 610, First Peak Micropore Diameter D1>

As described earlier, the porosity A1 and the first peak micropore diameter D1 of the positive electrode mixture layer 223 can be measured based on the volume Vb of holes and the micropore distribution in the positive electrode sheet 810 of each sample. In addition, the volume Vb of holes and the micropore distribution may be measured by, for example, the mercury intrusion method.

<Squeeze Rate X>

Figure 12:
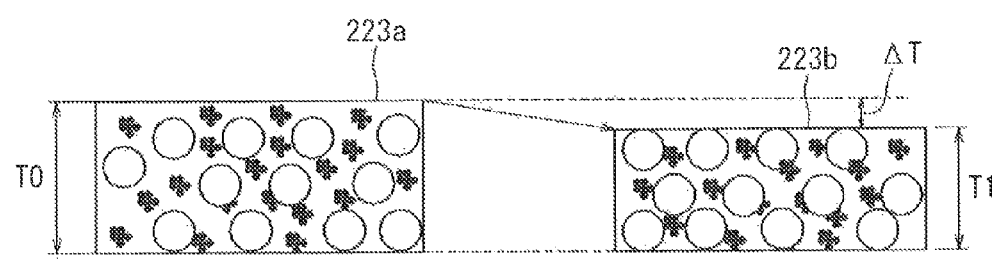
FIG. 12 is a sectional view of a positive electrode mixture layer for describing a squeeze rate X.

In addition, the "squeeze rate X" in Table 1 represents a "squeeze rate X" during the production process of the positive electrode sheet 810 for each sample of the evaluation test battery 800. In this case, as shown in FIG. 12, the "squeeze rate X" is a value obtained by dividing a variation $\Delta T$ by which the thickness of the positive electrode mixture layer 223 had varied in the rolling step when forming the positive electrode sheet 810 by a thickness T0 of the positive electrode mixture layer 223a prior to the rolling step (squeeze rate $X=\Delta T/T0$). The variation $\Delta T$ by which the thickness of the positive electrode mixture layer 223a had varied is expressed as a difference between the thickness T0 of a positive electrode mixture layer 223a prior to the rolling step and a thickness T1 of a positive electrode mixture layer 223b after the rolling step ($\Delta T=T0-T1$). Moreover, the thickness T0 of the positive electrode mixture layer 223a prior to the rolling step and the thickness T1 of the positive electrode mixture layer 223b after the rolling step do not include the thickness of the positive electrode current collector 221. When the thickness of the positive electrode current collector 221 varies in the rolling step, the thickness of the positive electrode current collector 221 may be excluded. In addition, for example, an average value of the thickness T1 of the positive electrode mixture layer 223b over a predetermined width (for example, 1000 mm) of the positive electrode sheet 220 may be adopted as the thickness T0 of the positive electrode mixture layer 223a prior to the rolling step and the thickness T1 of the positive electrode mixture layer 223b after the rolling step.

Furthermore, for each sample, a plurality of evaluation test batteries 800 were prepared. Same production conditions were applied for the evaluation test batteries 800 for a same sample including production conditions of the positive electrode sheet 810. In addition, conditions other than those listed in Table 1 were set approximately the same among different samples. For example, an aluminum foil with a thickness of 15 μm was used as the positive electrode current collector 221. Furthermore, the amount of coating by the positive electrode mixture on the positive electrode current collector 221 was set to approximately 15 mg/cm² (mass per unit area).

<10-Second Output (25° C.)>

A 10-second output (25° C.) is obtained by the following procedures. Moreover, in the present embodiment, the measurement temperature embodiment was set to normal temperature (in this case, 25° C.).

Procedure 1: As SOC adjustment, charge at a constant current of 1 C until SOC 60% is reached, charge at a constant voltage at the SOC 60% for 2.5 hours, and subsequently pause for 10 seconds.

Procedure 2: After Procedure 1, discharge at a constant wattage (W) (constant output) from SOC 60%. Constant wattage discharge is performed by increasing current as voltage decreases due to the discharge so that a same amount of power is discharged per unit time. Then, measure the number of seconds until discharged voltage reaches a predetermined cutoff voltage from the state of SOC 60%.

Procedure 3: Repeat Procedures 1 and 2 by varying constant wattage discharge conditions within a range of 5 W to 50 W in Procedure 2 (refer to FIG. 20). Subsequently, plot respectively measured numbers of seconds until the predetermined cutoff voltage on the abscissa and plot power (W) conditions of constant wattage discharge during the measurements on the ordinate. Finally, calculate W at 10 seconds from an approximate curve.

According to the "10-second output (25° C.)", high-rate output characteristics can be identified. In Table 1, among samples 1 to 41, the higher the numerical value, the higher the output characteristics of the battery.

Figure 20:
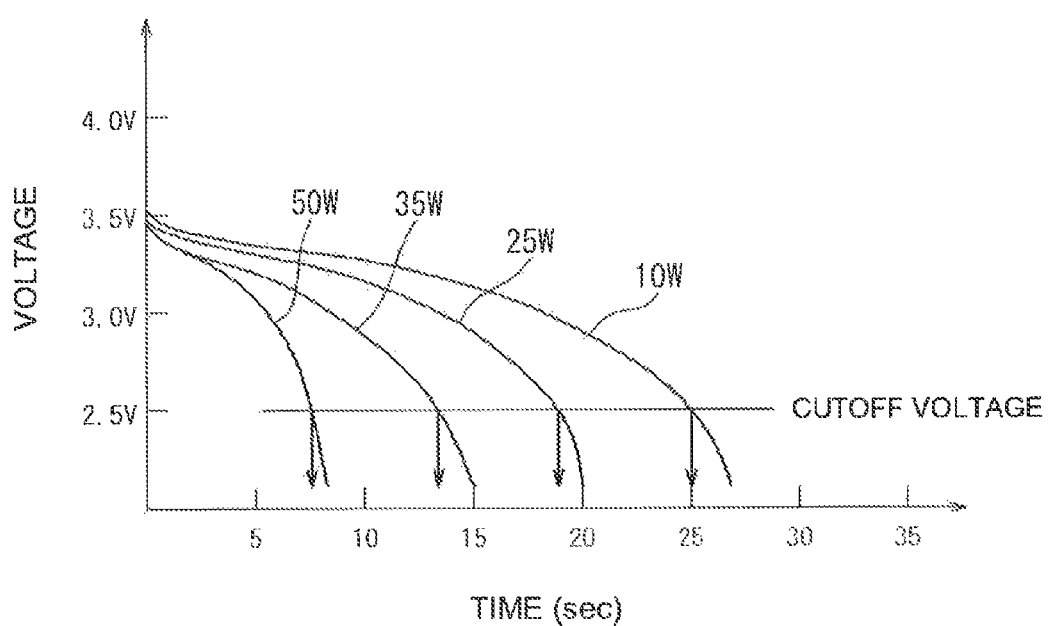
FIG. 20 is a diagram showing a relationship between voltage drop and time of a constant wattage discharge for a 10-second output (25° C.)

With respect to the 10-second output (25° C.), FIG. 20 shows a relationship between voltage drop and time of the constant wattage discharge obtained by Procedure 2.

In this case, for example, as shown in FIG. 20, constant wattage discharge is performed at a predetermined power set within a range of 5 W to 50 W from the state of SOC 60%. With respect to the power of the constant wattage discharge, FIG. 20 shows typical examples of relationships between voltage drop and time (sec) for respective constant wattage discharges at 10 W, 25 W, 35 W, and 50 W. In this case, 2.5 V is set as the predetermined cutoff voltage. Here, as shown in FIG. 20, based on the relationships between voltage drop and time (sec) for respective constant wattage discharges at 10 W, 25 W, 35 W, and 50 W, discharge output (W) of the constant wattage discharge (amount of discharge power of the constant wattage discharge) and the time (sec) until a voltage drop occurs is measured.

Figure 21:
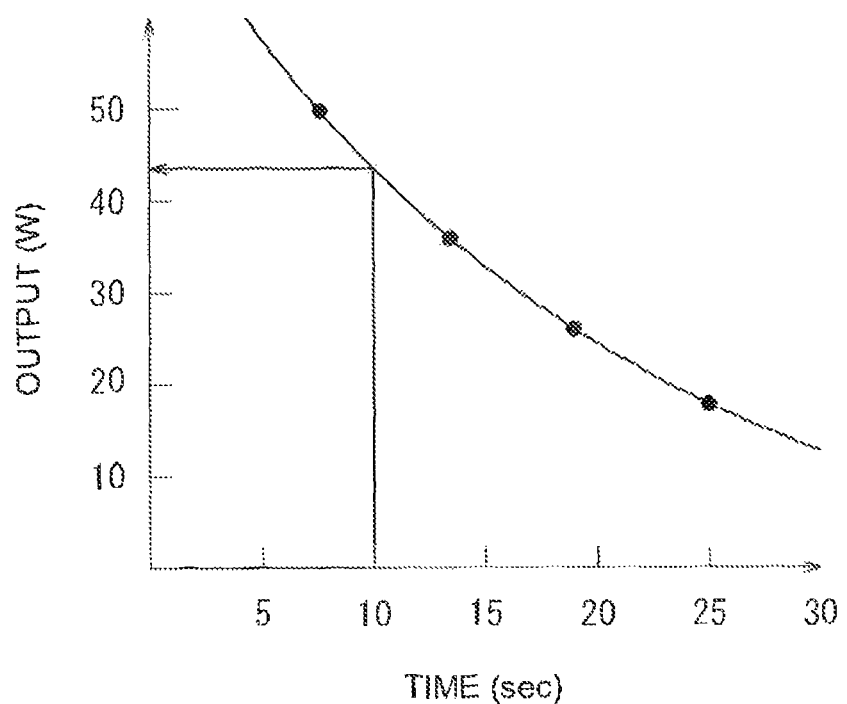
FIG. 21 is a diagram showing an approximate curve obtained by Procedure 3 for a 10-second output (25° C.).

In addition, FIG. 21 shows the approximate curve of Procedure 3 and a method of calculating the 10-second output. In this case, the approximate curve shown in FIG. 21 is prepared as a graph in which time (sec) is set to the abscissa and output (W) is set to the ordinate. In addition, the discharge output (W) of constant wattage discharge and the time (see) until a voltage drop occurs as obtained from FIG. 20 are plotted onto the graph. An approximate curve is drawn on the plots. Then, based on the approximate curve, discharge output at a position corresponding to 10 seconds on the abscissa of the graph shown in FIG. 21 is obtained as a 10-second output.

<20 C Discharge Cycle Resistance Increase Rate (−15° C.)>

Figure 13:
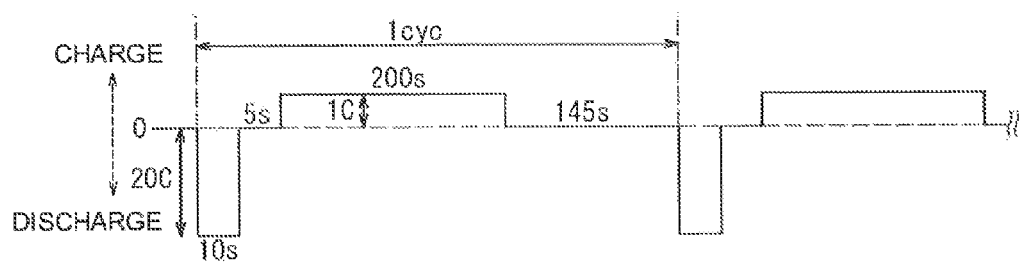
FIG. 13 is a diagram showing a charge-discharge cycle in a high-rate cycling characteristics evaluation test.

For the "20 C discharge cycle resistance increase rate (−15° C.)", after an adjustment is made to a charged state of SOC 60% in a temperature environment of −15° C. by the SOC adjustment described above, charge-discharge cycles in which (I) to (V) below constitute one cycle is repeated 2500 times. The "20 C discharge cycle resistance increase rate (−15° C.)" in Table 1 represents a rate of increase of resistance of the discharge of (I) in the 2500th cycle. Here, FIG. 13 shows a charge-discharge cycle in this characteristic evaluation test. Moreover, this evaluation test is performed using a different evaluation test battery 800 to that used in the "10-second output (25° C.)" evaluation test.

Hereinafter, one charge-discharge cycle constituted by (I) to (V) will be described.

(I) Discharge for 10 seconds at a constant current of 20 C (here, 4.4 A).

(II) Pause for 5 seconds.

(III) Charge for 200 seconds at a constant current of 1 C.

(IV) Pause for 145 seconds.

(V) Measure the rate of increase of resistance during the discharging of (I) for each cycle.

However, the SOC adjustment described above is performed once every 100 repetitions of the charge-discharge cycle constituted by (I) to (V).

<Samples 1 to 41>

Table 1 shows, for samples 1 to 41, a "squeeze rate X", a "porosity (Vb/Va)", a "first peak micropore diameter D1", "DBP absorption (mL/100 g) of positive electrode active material 610 and electrically conductive material 620", the "positive electrode active material 610", the "electrically conductive material 620", the "binder 630", a "10-second output (25° C.)", and a "20 C discharge cycle resistance increase rate (−15° C.)".

As described earlier, according to the reasoning by the present inventors, in order to improve output of a secondary battery, necessary holes which enable penetration by an electrolyte solution favorably exist around the positive electrode active material 610 in the positive electrode mixture layer 223 and around the negative electrode active material 710 in the negative electrode mixture layer 243 (refer to FIGS. 5 and 6). In addition, for this reason, desirably, the porosity A1 of the positive electrode mixture layer 223 and the porosity A2 of the negative electrode mixture layer 243 described earlier are both relatively high (for example, approximately 0.30≤A1, A2). Furthermore, according to the reasoning by the present inventors, in order to improve output of a secondary battery, the electrically conductive material 620 is favorably densely aggregated between the positive electrode active material 610 and the positive electrode current collector 221 in the positive electrode mixture layer 223. Therefore, desirably, the first peak micropore diameter D1 described above is relatively small.

With samples having a same DBP absorption (mL/100 g) of the positive electrode active material 610 and the electrically conductive material 620 and a same mixture composition (the weight ratio of the positive electrode active material 610, the electrically conductive material 620, and the binder 630), there is a tendency that the greater the porosity (Vb/Va), the higher the value of the "10-second output (25° C.)" and the lower the value of the "20 C discharge cycle resistance increase rate (−15° C.)". In other words, conceivably, the greater the porosity (Vb/Va) of the positive electrode mixture layer 223, the greater the improvement in characteristics of the secondary battery. Furthermore, even with the same porosity, the smaller the first peak micropore diameter D1, the higher the value of the "10-second output (25° C.)" and the lower the value of the "20 C discharge cycle resistance increase rate (−15° C.)".

For example, as shown in Table 1, samples 2 to 4, samples 5 to 8, samples 9 to 11, samples 12 to 15, samples 16 to 26, and samples 27 to 31 respectively have the same DBP absorption (mL/100 g) of the positive electrode active material 610 and the electrically conductive material 620 and the same mixture composition (the weight ratio of the positive electrode active material 610, the electrically conductive material 620, and the binder 630). In addition, the structure of the negative electrode sheet 240 is the same and the porosity A2 of the negative electrode mixture layer 243 is also approximately the same. In this case, there is a tendency that the higher the porosity A1 of the positive electrode mixture layer 223, the higher the value of the "10-second output (25° C.)" and the lower the value of the "20 C discharge cycle resistance increase rate (−15° C.)". Furthermore, for example, as shown by samples 6 and 7, even with the same porosity, the smaller the first peak micropore diameter D1, the higher the value of the "10-second output (25° C.)" and the lower the value of the "20 C discharge cycle resistance increase rate (−15° C.)". As shown, there is a tendency that the smaller the first peak micropore diameter D1, the higher the value of the "10-second output (25° C.)" and the lower the value of the "20 C discharge cycle resistance increase rate (−15° C.)".

In addition, for example, with the samples 37 to 41 in Table 1, both the porosity A1 (Vb/Va) of the positive electrode mixture layer 223 and the porosity A2 of the negative electrode mixture layer 243 are relatively high. However, the values of the "10-second output (25° C.)" and the "20 C discharge cycling resistance increase rate (−15° C.)" are not as high as those of the samples 1 to 31. With the samples 37 to 41 in Table 1, the first peak micropore diameter D1 is relatively large at D1≥0.25. Therefore, it is conceivable that the electrically conductive material 620 in the positive electrode mixture layer 223 is not too densely aggregated. This is conceivably one of the reasons for the inferior values of the "10-second output (25° C.)" and the "20 C discharge cycle resistance increase rate (−15° C.)". As shown, when both the porosity A1 of the positive electrode mixture layer 223 and the porosity A2 of the negative electrode mixture layer 243 are relatively high, there is a tendency that a relatively smaller first peak micropore diameter D1 (for example, approximately D1≤0.25 μm) results in a greater improvement of the characteristics of the secondary battery 100.

Moreover, the first peak micropore diameter D1 may satisfy D1<0.25 μm or may be even smaller so as to satisfy D1≤0.20 μm.

As described above, when both the porosity A1 of the positive electrode mixture layer 223 and the porosity A2 of the negative electrode mixture layer 243 are relatively high, the electrolyte solution is able to penetrate sufficiently into the positive electrode mixture layer 223. As a result, lithium ions (Li) can migrate more smoothly between the positive electrode active material 610 and the electrolyte solution and between the negative electrode active material 710 and the electrolyte solution. In addition, by reducing the first peak micropore diameter D1, the electrically conductive material 620 in the positive electrode mixture layer 223 can be densely aggregated. When the electrically conductive material 620 is densely aggregated, electron transfer occurs more readily between the positive electrode active material 610 and the positive electrode current collector 221. As shown, when both the porosity A1 of the positive electrode mixture layer 223 and the porosity A2 of the negative electrode mixture layer 243 are relatively high and, at the same time, the first peak micropore diameter D1 of the positive electrode mixture layer 223 is relatively small, the output characteristics of the secondary battery can be improved significantly.

Furthermore, in view of the samples 32 to 41, it is conceivable that DBP absorption (mL/100 g) may also influence the output characteristics of the secondary battery. Therefore, when considering the DBP absorption (mL/100 g) of the positive electrode active material 610, the DBP absorption B of the positive electrode active material is more favorably approximately 20 (mL/100 g)≤B. More favorably, the DBP absorption B may satisfy 23 (mL/100 g)≤B, may even more favorably satisfy 30 (mL/100 g)≤B, and may further more favorably satisfy 33 (mL/100 g)≤B. While an upper limit of the DBP absorption B of the positive electrode active material is not particularly set, for example, the DBP absorption B of the positive electrode active material may also satisfy 60 (mL/100 g). In addition, when considering the DBP absorption (mL/100 g) of the electrically conductive material 620, the DBP absorption D of the electrically conductive material 620 may satisfy approximately 100 (mL/100 g)≤D. While an upper limit of the DBP absorption D of the electrically conductive material 620 is not particularly set, for example, the DBP absorption D of the electrically conductive material 620 may be 300 (mL/100 g).

As shown, according to findings made by the present inventors, for example, the porosity A1 of the positive electrode mixture layer 223 described above may satisfy approximately 0.30≤A1 and, at the same time, the porosity A2 of the negative electrode mixture layer 243 may satisfy approximately 0.30≤A2. More desirably, A1≤A2 may be satisfied and, desirably, the first peak micropore diameter D1 may satisfy D1≤0.24 μm. Furthermore, the DBP absorption B of the positive electrode active material 610 may satisfy 30 (mL/100 g)≤B. Moreover, the DBP absorption D of the electrically conductive material 620 may satisfy 100 (mL/100 g)≤D. By selectively adopting the positive electrode active material 610, the electrically conductive material 620, the positive electrode mixture layer 223, and the negative electrode mixture layer 243 having the characteristics described above, the performance of the secondary battery 100 in terms of output characteristics can be significantly improved.

In other words, according to this configuration, since both the porosity A1 of the positive electrode mixture layer 223 and the porosity A2 of the negative electrode mixture layer 243 are relatively high, diffusion of lithium ions into the positive electrode mixture layer 223 and the negative electrode mixture layer 243 occurs more smoothly. As a result, lithium ions (Li) can migrate more smoothly between the positive electrode active material 610 and the electrolyte solution and between the negative electrode active material 710 and the electrolyte solution. In addition, since the first peak micropore diameter D1 of the positive electrode mixture layer 223 is relatively small, in terms of structure, the electrically conductive material 620 is densely aggregated and electron transfer occurs more readily between the positive electrode active material 610 and the positive electrode current collector 221. Therefore, migration of lithium ions (Li) and transfer of electrons at the positive electrode occur more readily and the output of the secondary battery can be improved. Furthermore, according to this configuration, the micropore diameter D1 of the positive electrode mixture layer 223 described above becomes 0.25 μm or smaller even though the porosity A1 of the positive electrode mixture layer 223 satisfies approximately 0.30≤A1 and is therefore relatively high.

<Forming Process of Positive Electrode Mixture Layer 223>

Furthermore, as described earlier, a process of forming the positive electrode mixture layer 223 comprises a coating step, a drying step, and a rolling step. In the coating step, the positive electrode mixture 224 containing the positive electrode active material 610 and the electrically conductive material 620 is coated onto the positive electrode current collector 221. In the drying step, the positive electrode mixture 224 coated onto the positive electrode current collector 221 in the coating step is dried. In the rolling step, the positive electrode mixture layer 223 dried in the drying step is rolled. A method of achieving the porosity A1 and the first peak micropore diameter D1 described above for the positive electrode mixture layer 223, when performing these steps involves adjusting a rolling quantity (the squeeze rate X) in the rolling step.

In other words, according to findings made by the present inventors, the first peak micropore diameter D1 described above and the squeeze rate X in the rolling step have a generally correlative relationship as shown in FIG. 14. Therefore, the squeeze rate X may be determined to a certain degree when adjusting the rolling quantity of the rolling step.

In this case, for example, the rolling quantity of the rolling step may be adjusted so that the squeeze rate X is within a range of 0.09≤X≤0.60. The squeeze rate X is a value obtained by dividing a variation ΔT by which a thickness of the positive electrode mixture layer 223 varies due to the rolling step by a thickness T0 of the positive electrode mixture layer 223 prior to the rolling step. Subsequently, after the rolling step, the positive electrode mixture layer 223 that satisfies required conditions 1 and 2 may be obtained. In this case, condition 1 requires that the porosity A1 of the positive electrode mixture layer 223 after the rolling step satisfies 0.30≤A1. Meanwhile, condition 2 requires that, in a micropore distribution of differential micropore volume with respect to micropore diameter as measured by the mercury intrusion method, the positive electrode mixture layer 223 after the rolling step has a first peak at which a micropore diameter D1 satisfies D1≤0.25 μm and a second peak at which a micropore diameter D2 is greater than the first peak micropore diameter D1.

As described above, the squeeze rate X may be adjusted in the rolling step so that in the positive electrode mixture layer 223, a required porosity A1 is obtained and, at the same time, the first peak micropore diameter D1 thereof has a required size. Moreover, conceivably, the greater the squeeze rate X, the smaller the first peak micropore diameter D1 and the denser the electrically conductive material 620 in the positive electrode mixture layer 223. In this case for example, the rolling quantity may be adjusted so that the squeeze rate X satisfies 0.3≤X.

In addition, the lower the density of the positive electrode mixture layer 223 after the rolling step, the better. Therefore, the density of the positive electrode mixture layer 223 is favorably set lower even before the rolling step. With the lithium-containing complex oxide described earlier, for example, the density of the positive electrode mixture layer 223 prior to the rolling step may be set to 1.8 g/mL or lower.

<Example of Preferable Positive Electrode Active Material 610>

Hereinafter, a preferable positive electrode active material 610 for achieving the positive electrode mixture layer 223 described above will be exemplified.

As described earlier, there is a tendency that the higher the porosity (Vb/Va) of the positive electrode mixture layer 223, the greater the improvement in output characteristics of the secondary battery. However, with a positive electrode active material 610 consisting of solid particles, there is a limit to increasing porosity (Vb/Va). In addition, there is also a limit to reducing the first peak micropore diameter D11. Therefore, in order to increase the porosity (Vb/Va) and reduce the first peak micropore diameter D1 at the same time, it is important to select a positive electrode active material 610 suitable for this purpose.

Therefore, the present inventors considered selecting a positive electrode active material 610 which itself has holes and which improves the porosity A1 of the positive electrode mixture layer 223. As the positive electrode active material 610, although not shown, for example, the particles of the positive electrode active material 610 may be granulated by spray-drying to obtain a particulate structure having minute holes inside. The porosity A1 of the positive electrode mixture layer 223 can also be improved by using such a positive electrode active material 610.

Figure 15:
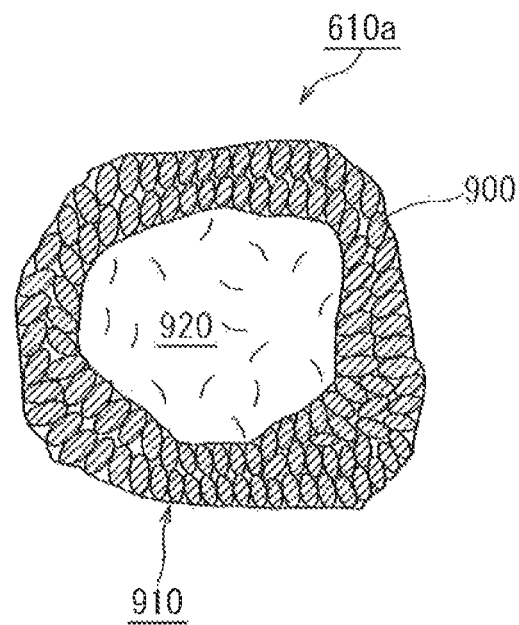
FIG. 15 is a diagram showing an example of positive electrode active material particles.

For example, the positive electrode active material 610 may be constituted by secondary particles formed by the aggregation of a plurality of primary particles of a lithium transition metal oxide. In this case, for example, as shown in FIG. 15, a positive electrode active material 610*a* may be used in which a hollow portion 920 is formed in secondary particles 910. According to this positive electrode active material 610*a*, since the hollow portion 920 is formed in the secondary particles 910, the holes inside the positive electrode mixture layer 223 are increased by the hollow portion 920 and the porosity A1 of the positive electrode mixture layer 223 can be improved. Furthermore, in the mode shown in FIG. 15, a large number of micropores too minute to be illustratable are desirably formed between primary particles 900 in the secondary particles 910 to create a configuration which enables the electrolyte solution to penetrate into the hollow portion 920. Accordingly, since the primary particles 900 can even be utilized inside the hollow portion 920, the output characteristics of the secondary battery can be improved. Hereinafter, a structure of the positive electrode active material 610*a* having such a hollow portion 920 will be referred to as a "hollow structure" when appropriate.

In addition, as another mode, for example, a positive electrode active material 610 may further have through holes 930 that penetrate the secondary particles 910 so as to connect the hollow portion 920 to the outside as shown in FIG. 12. Hereinafter, a structure of the positive electrode active material 610*b* having such through holes 930 will be referred to as a "holed hollow structure" when appropriate.

Due to the positive electrode active material 610*b*, an electrolyte solution is able to migrate more easily between the hollow portion 920 and the outside through the through holes 930 and the electrolyte solution in the hollow portion 920 is appropriately replaced. Therefore, a depletion or a shortage of the electrolyte solution is less likely to occur inside the hollow portion 920. As a result, the primary particles 900 of the positive electrode active material 610 are more actively utilized inside the hollow portion 920. Accordingly, the output characteristics of the secondary battery can be further improved.

In this case, an opening width k of the through holes 930 may be on average 0.01 μm or more. Accordingly, the electrolyte solution can penetrate into the hollow portion 920 more reliably and the effects described above can be more readily obtained. In addition, the opening width k of the through holes 930 may be on average 2.0 μm or less. Here, the opening width k of the through holes 930 refers to the length across a portion where the through holes 930 are narrowest (an inner diameter of the through holes 930) among a path which penetrates through the secondary particles and which extend to the hollow portion 920 from the outside of the active material particles. Moreover, when there are a plurality of through holes 930 in the hollow portion 920, an evaluation may be performed with the through hole 930 having the greatest opening width k among the plurality of the through holes 930. Furthermore, the opening width k of the through holes 930 may be on average 2.0 μm or less, favorably on average 1.0 μm or less, and more favorably on average 0.5 μm or less.

In addition, the number of through holes 930 may be around on average 1 to 20 per one particle of the positive electrode active material 610*b* and more favorably around on average 1 to 5. According to the positive electrode active material 610*b* structured in this manner, favorable battery performance can be more stably demonstrated (such as by inhibiting deterioration caused by charge-discharge cycling). Moreover, the number of through holes 930 in the positive electrode active material 610*b* of the holed hollow structure may be obtained by, for example, ascertaining the number of through holes per particle for at least 10 or more arbitrarily selected active material particles and then determining an arithmetic average thereof. A method of producing the positive electrode active material 610*b* with this holed hollow structure may include, for example, a raw material hydroxide formation step, a mixing step, and a calcining step.

In this case, the raw material hydroxide formation step is a step of supplying ammonium ions to an aqueous solution of a transition metal compound and precipitating particles of a transition metal hydroxide from the aqueous solution. The aqueous solution favorably contains at least one transition metal element that composes the lithium transition metal oxide. In addition, the raw material hydroxide formation step favorably includes a nucleation stage in which a transition metal hydroxide is precipitated from the aqueous solution at pH 12 or higher and at an ammonium ion concentration of 25 g/L or less and a particle growth stage in which the precipitated transition metal hydroxide is grown at a pH of less than 12 and at an ammonium ion concentration of 3 g/L or more.

Furthermore, the mixing step is a step of mixing particles of the transition metal hydroxide obtained in the raw material hydroxide formation step with a lithium compound to prepare an unfired mixture. Moreover, the calcining step is a step of calcining the mixture obtained in the mixing step to obtain active material particles. According to this production method, the positive electrode active material 610*b* having a holed hollow structure can be suitably produced.

In addition, in this case, the calcining step may be carried out such that a maximum calcining temperature is 800° C. to 1100° C. (favorably, 800° C. to 1000° C.). As a result, since the primary particles can be adequately sintered, active material particles having a desired average hardness can be preferably produced. This calcining step is favorably carried out so that, for example, secondary particles are formed in which gaps are substantially not present at the grain boundaries of the primary particles at portions other than the hollow portion 920 and the through holes 930.

Furthermore, the calcining step may include a first calcining stage in which the mixture is fired at a temperature T1 of 700° C. to 900° C. and a second calcining stage in which the result of the first calcining stage is fired at a temperature T2 of 800° C. to 1100° C. (favorably, 800° C. to 1000° C.) that is higher than the calcining temperature T1 of the first calcining stage.

In a favorable aspect of the active material particle production method disclosed herein, the calcining step includes a first calcining stage in which the mixture is fired at a temperature T1 of 700° C. to 900° C. and a second calcining stage in which the result of the first calcining stage is fired at a temperature T2 of 800° C. to 1100° C. (favorably, 800° C. to 1000° C.) that is higher than the calcining temperature T1 of the first calcining stage. As a result of calcining the mixture in an aspect that includes these first and second calcining stages, favorable active material particles having a holed hollow structure disclosed herein (refer to the positive electrode active material 610*b* shown in FIG. 12) can be suitably produced. In addition, for example, by suitably elaborating the calcining step, the positive electrode active material 610*a* with a "hollow structure" such as that shown in FIG. 11 can be obtained by a similar method.

Furthermore, in this case, BET specific surface areas of the positive electrode active materials 610 preferably range from 0.5 to 1.9 m$^2$/g. The positive electrode active materials 610 satisfying such a requirement regarding BET specific surface area can be used in a positive electrode of the lithium-ion secondary battery 100 and are able to yield a battery that stably demonstrates higher performance. For example, a lithium secondary battery can be constructed which has low internal resistance (or in other words, favorable output characteristics) and which demonstrates little increase in resistance attributable to charge-discharge cycling (particularly, charge-discharge cycling that includes high-rate discharge).

If the BET specific surface areas of the positive electrode active materials 610a and 610b are excessively small, effects of improving battery performance (for example, the effect of reducing internal resistance) tend to decrease. On the other hand, if the BET specific surface area is excessively large, the effect of inhibiting deterioration attributable to charge-discharge cycling tends to decrease. According to the favorable positive electrode active materials 610a and 610b having a hollow structure and satisfying the requirement regarding the BET specific surface area disclosed herein, an improvement of high-rate characteristics (for example, at least one of inhibition of increases in resistance caused by high-rate cycling in the manner of a high-rate cycling test to be subsequently described, and improvement of high-rate discharge performance), and prevention of wear deterioration (for example, at least one of inhibition of increases in resistance with respect to endurance cycling in the manner of an endurance test to be subsequently described, and improvement of capacity retention rate) can be realized simultaneously.

The positive electrode active material 610a with the "hollow structure" and the positive electrode active material 610b with the "holed hollow structure" described above may be adopted as preferable modes of the positive electrode active material 610 whose BET specific surface area is within a range of 0.5 to 1.9 $m^2/g$.

In addition, for example, the positive electrode active material 610a with a "hollow structure" and the positive electrode active material 610b with a "holed hollow structure" may have an average hardness of 0.5 MPa or more as obtained by measuring dynamic hardness under conditions of a loading speed of 0.5 mN/sec to 3 mN/sec using a flat diamond indenter having a diameter of 50 μm.

Figure 16:
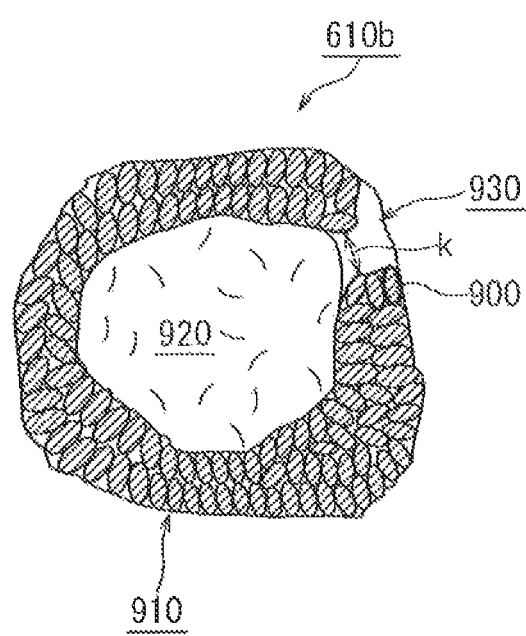
FIG. 16 is a diagram showing an example of positive electrode active material particles.

In another favorable aspect of the active material particles disclosed herein, the average hardness of the positive electrode active material 610a having a hollow structure and the positive electrode active material 610b having a holed hollow structure is roughly 0.5 MPa or more. Here, average hardness refers to a value obtained by measuring dynamic microhardness under conditions of a loading speed of 0.5 mN/sec to 3 mN/sec using a flat diamond indenter having a diameter of 50 μm. For example, a microhardness tester MCT-W201 manufactured by Shimadzu Corporation can be used for the dynamic microhardness measurement. In this manner, active material particles having a hollow structure and high average hardness (or in other words, high shape retention) as shown in FIGS. 15 and 16 are able to yield a battery that stably demonstrates higher performance. Therefore, for example, a contribution can be made to constructing a lithium secondary battery that has low internal resistance (or in other words, favorable output characteristics) and demonstrates little increase in internal resistance attributable to charge-discharge cycling (particularly, charge-discharge cycling that includes high-rate discharge).

In addition, the positive electrode active material 610a having a hollow structure and the positive electrode active material 610b having a holed hollow structure may be a lithium transition metal oxide which has a layered structure and which contains nickel as a constituent element. Furthermore, the positive electrode active material 610a having a hollow structure and the positive electrode active material 610b having a holed hollow structure may be a lithium transition metal oxide which has a layered structure and which contains nickel, cobalt, and manganese as constituent elements.

In addition, for example, the positive electrode active material 610a having a hollow structure and the positive electrode active material 610b having a holed hollow structure favorably have an average particle diameter within a range of approximately 3 μm to 10 μm. Furthermore, an average opening size of the through holes 930 of the positive electrode active material 610b having a holed hollow structure is favorably ½ or less with respect to the average particle diameter of the positive electrode active material 610b. Since the average opening size lies within a suitable range, the positive electrode active material 610b is able to easily secure a desired average hardness while suitably demonstrating effects of improving battery performance (such as the effect of reducing internal resistance) as a result of having a holed hollow structure. Thus, favorable battery performance can be demonstrated more stably.

In addition, by using the positive electrode active material 610a having the hollow structure or the positive electrode active material 610b having the holed hollow structure, the porosity A1 of the positive electrode mixture layer 223 can be increased readily. Furthermore, the positive electrode active material 610a having the hollow structure and the positive electrode active material 610b having the holed hollow structure have a higher bulk density compared to a case where a solid positive electrode active material is used. Therefore, when using a positive electrode active material with the same weight, the positive electrode active material 610a having the hollow structure and the positive electrode active material 610b having the holed hollow structure are capable of reducing the density of the positive electrode mixture layer 223 to a greater degree than a solid positive electrode active material. In addition, since the positive electrode active material 610a having the hollow structure and the positive electrode active material 610b having the holed hollow structure are more bulky than a solid positive electrode active material, space for the electrically conductive material 620 inside the positive electrode mixture layer 223 becomes smaller. As a result, in terms of structure, the electrically conductive material 620 is able to aggregate more readily. As shown, the first peak micropore distribution D1 in the micropore distribution of the positive electrode mixture layer 223 can be readily reduced. In addition, with the holed hollow structure, the electrolyte solution is more readily introduced into the hollow portion 920 of the secondary particles 910 of the positive electrode active material 610 and the amount of the positive electrode active material 610 that contributes to the release and absorption of lithium ions (Li ions) increases. Therefore, as the positive electrode active material 610, the positive electrode active material 610a with the hollow structure is favorably used, and the positive electrode active material 610b with the holed hollow structure is more favorably used.

Figure 17:
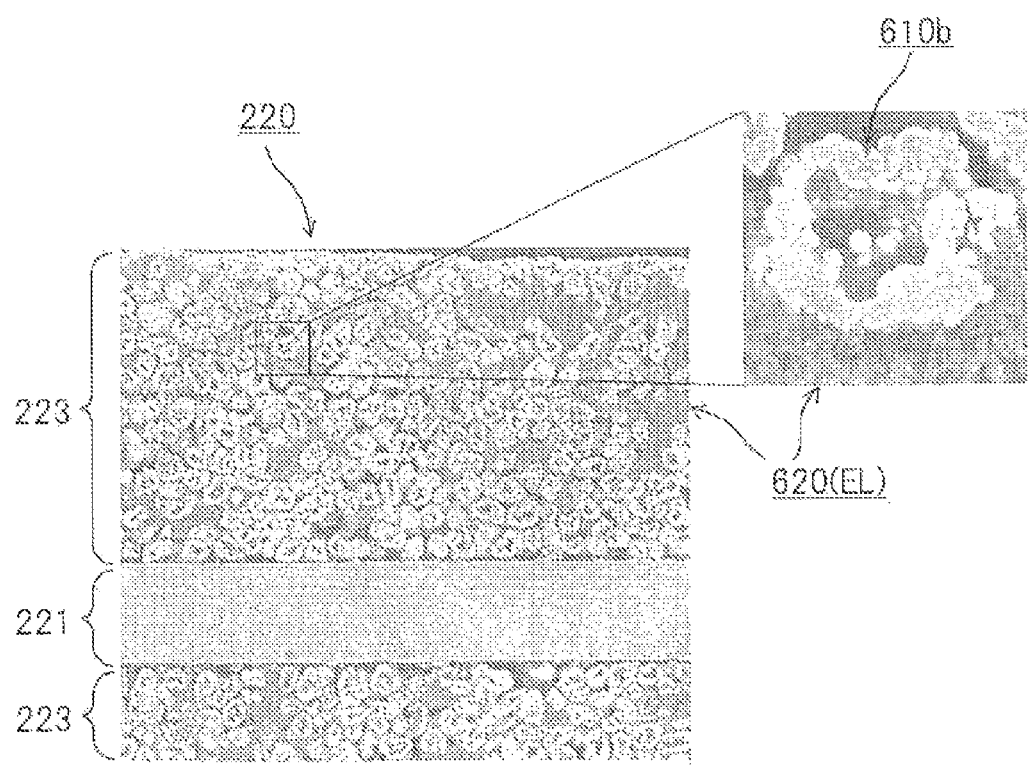
FIG. 17 is a sectional photograph showing a section of a positive electrode mixture layer.

FIG. 17 shows a sectional photograph of the positive electrode mixture layer 223 when using the positive electrode active material 610b with the holed hollow structure. As shown in FIG. 17, the electrically conductive material 620 is densely aggregated between particles of the positive electrode active material 610b with the holed hollow structure. For example, the electrically conductive material 620 is densely aggregated in a portion denoted as EL in FIG. 17. As shown, by using the positive electrode active material 610b with the holed hollow structure, the porosity A1 of the positive electrode mixture layer 223 can be improved and, at the same time, the electrically conductive material 620 can be densely aggregated. As a result, migration of lithium ions (Li ions) and transfer of electrons in the positive electrode mixture layer 223 can be performed more readily. Furthermore, in the present embodiment, since the porosity A2 of the negative electrode mixture layer 243 is increased to a certain extent together with the porosity A1 of the positive electrode mixture layer 223, an effect of the increased porosity A1 of the positive electrode mixture layer 223 is demonstrated more readily. As a result, the output of a secondary battery can be improved.

<Example of Positive Electrode Active Material>

Moreover, in a favorable mode, the positive electrode active material may be expressed as $Li_{1+x}(Ni_yCo_zMn_{1-y-z}M_\gamma)O_2$, where $0 \le x \le 0.2$, $0.5 \le y \le 1.0$, $0 \le z \le 0.5$, $0 \le \gamma \le 0.2$, and $0 \le (1-y-z)$, and M is composed of at least one element selected from the element group consisting of F, B, Al, W, Mo, Cr, Ta, Nb, V, Zr, Ti, Y, Ca, Mg, Fe, and Na. In this case, in the lithium transition metal oxide containing Ni, Co, and Mn, Ni has a highest content by percentage among Ni, Co, and Mn. A lithium transition metal oxide which contains Ni, Co, and Mn and in which Ni has a highest content by percentage among Ni, Co, and Mn has a large specific capacity (an amount of energy per volume). Therefore, by using a lithium transition metal oxide in which Ni has a highest content by percentage among Ni, Co, and Mn, required output characteristics of the secondary battery 100 can be maintained even when the amount of the positive electrode active material 610 is reduced.

For example, in a case where components other than the positive electrode active material 610 are the same, the following active materials 1 to 3 were compared as the positive electrode active material 610.

Active material 1: $Li_{1.15}(Ni_{0.34}Cu_{0.33}Mn_{0.33}W_{0.01})O_2$
(Specific capacity: 140 mAh/g (3.0-4.0V), average voltage: 3.72 V)
Active material 2: $Li_{1.1}(Ni_{0.55}Co_{0.20}Mn_{0.25}W_{0.01})O_2$
(Specific capacity: 161 mAh/g (3.0-4.0V), average voltage: 3.71 V)
Active material 3: $Li_{1.05}(Ni_{0.80}Co_{0.15}Al_{0.05})O_2$
(Specific capacity: 185 mAh/g (3.0-4.0V), average voltage: 3.70 V)

In this case, a mixture composition ratio of the positive electrode was set to active material:electrically conductive material:binder=90:7:3. In addition, acetylene black was used as the electrically conductive material and polyvinylidene fluoride (PVDF) was used as the binder. Furthermore, the porosity A1 of the positive electrode mixture layer 223 was set to 0.50 (50%). Moreover, coating by the mixture was performed on both surfaces of the positive electrode current collector 221 at a mixture coating weight of 10 mg/cm$^2$ per surface. In addition, usage of the positive electrode active material 610 was set to 35 g per cell.

Furthermore, a mixture composition ratio of the negative electrode was set to active material:thickener:binder=98:1:1. In this case, carboxymethyl cellulose (CMC) was used as the thickener and styrene butadiene rubber (SBR) was used as the binder. Moreover, the porosity A2 of the negative electrode mixture layer 243 was set to 0.55 (55%). In addition, coating by the mixture was performed on both surfaces of the positive electrode current collector 221 at a mixture coating weight of 6.4 mg/cm$^2$ per surface. Furthermore, usage of the positive electrode active material 610 was set to 26 g per cell.

Here, in the battery packs, cells were connected in series so as to produce 1000 Wh. As a result, with the active material 1 described above, the number of cells of the battery pack producing 1000 Wh was 55. In addition, with the active material 2 described above, the number of cells of the battery pack producing 1000 Wh was 48. Furthermore, with the active material 3 described above, the number of cells of the battery pack producing 1000 Wh was 42. As a result, the active material 2 contributes toward reducing weight or size by approximately 10% compared to the active material 1. In addition, the active material 3 contributes toward reducing weight or size by approximately 23% compared to the active material 1.

As shown, for example, the positive electrode active material may be a lithium transition metal oxide which has a layered structure and which contains nickel (Ni) as a constituent element. Furthermore, in a favorable mode, the positive electrode active material may be a lithium transition metal oxide which has a layered structure and which contains nickel (Ni), cobalt (Co), and manganese (Mn) as constituent elements. Moreover, in a favorable mode, the positive electrode active material may be expressed as $Li_{1+x}(Ni_yCo_zMn_{1-y-z}M_\gamma)O_2$, where $0 \le x \le 0.2$, $0.5 \le y \le 1.0$, $0 \le z \le 0.5$, $0 \le \gamma \le 0.2$, and $0 \le (1-y-z)$, and M is composed of at least one element selected from the element group consisting of F, B, Al, W, Mo, Cr, Ta, Nb, V, Zr, Ti, Y, Ca, Mg, Fe, and Na. As shown, a lithium transition metal oxide with a high nickel content by percentage and a high specific capacity may be used.

Figure 18:
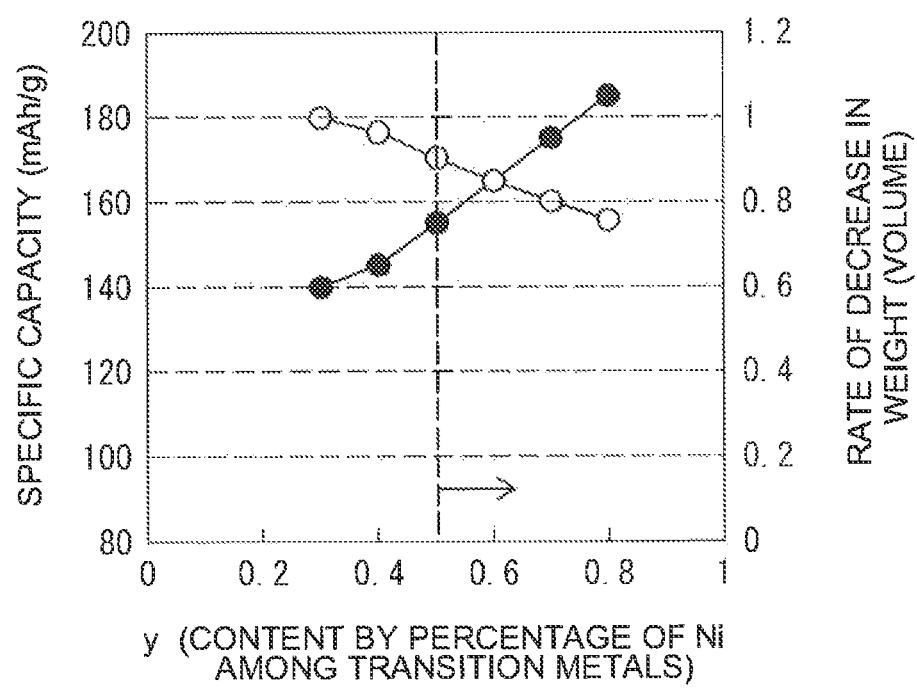
FIG. 18 is a diagram showing a relationship among a content by percentage y of Ni among transition metals in a lithium transition metal oxide, specific capacity, and a rate of decrease in weight (volume)

FIG. 18 is a diagram showing a relationship among a content by percentage y of Ni among transition metals in the lithium transition metal oxide ($Li_{1+x}(Ni_yCo_zMn_{1-y-z}M_\gamma)O_2$), specific capacity, and a rate of decrease in weight (volume). In FIG. 18, block dots represent specific capacity and white dots represent rate of decrease in weight (volume). As shown, when the content by percentage y of Ni among the transition metal element increases, the specific capacity increases and the weight (volume) can be reduced.

As described earlier, while the usage of the positive electrode active material 610 is desirably kept low when increasing the porosity A1 of the positive electrode mixture layer 223, necessary output characteristics of the secondary battery 100 can be maintained even when the usage of the positive electrode active material 610 is kept low. Therefore, by using a lithium transition metal oxide in which Ni has a highest content by percentage among Ni, Co, and Mn, the usage of the positive electrode active material 610 can be kept low and downsizing and weight reduction of the secondary battery 100 can be achieved. Furthermore, as a vehicle-mounted secondary battery, an assembled battery which combines a plurality of the secondary batteries 100 is used. In this case, by using a lithium transition metal oxide in which Ni has a highest content by percentage among Ni, Co, and Mn, downsizing and weight reduction of each one of the secondary batteries 100 can be achieved while maintaining a similar output level. In addition, by using a lithium transition metal oxide in which Ni has a highest content by percentage among Ni, Co, and Mn, output can be increased even when the size remains the same. Therefore, downsizing and weight reduction can be achieved by reducing the number of batteries used in an assembled battery, and an output of an assembled battery can be significantly increased by combining secondary batteries 100 of the same time or the same number. As shown, by using a lithium transition metal oxide in which Ni has a highest content by percentage among Ni, Co, and Mn, fuel efficiency of a vehicle may be improved and a degree of freedom when mounting an assembled battery on a vehicle may be significantly increased.

While an example of a suitable positive electrode active material has been described as a positive electrode active material contained in a positive electrode mixture layer of a secondary battery, the positive electrode active material of a secondary battery according to the present invention is not limited to the above unless specifically mentioned otherwise.

As described above, the secondary battery 100 (refer to FIG. 1) comprises the positive electrode mixture layer 223 (refer to FIG. 5) containing the positive electrode active material 610 and the electrically conductive material 620, the positive electrode current collector 221 on which the positive electrode mixture layer 223 is coated, the negative electrode mixture layer 243 (refer to FIG. 6) containing the negative electrode active material 710, and the negative electrode current collector 241 on which the negative electrode mixture layer 243 is coated. In this case, the porosity A1 of the positive electrode mixture layer 223 satisfies 0.30≤A1 and, at the same time, the porosity A2 of the negative electrode mixture layer 243 satisfies 0.30≤A2. Consequently, an electrolyte (in this case, lithium ions (Li)) that is respectively absorbed and released by the positive electrode active material 610 and the negative electrode active material 710 can migrate readily between the positive electrode active material 610 and an electrolyte solution and between the negative electrode active material 710 and the electrolyte solution. In addition, electron transfer at the positive electrode mixture layer 223 becomes smoother.

In this case, the porosity A1 of the positive electrode mixture layer 223 and the porosity A2 of the negative electrode mixture layer 243 may satisfy A1≤A2. When A1≤A2 is true in a case where the porosity A1 of the positive electrode mixture layer 223 is the same, an effect of an increase in the porosity A1 of the positive electrode mixture layer 223 is better demonstrated and a resistance of the secondary battery 100 can be more reduced than in a case where A1>A2.

In addition, in a micropore distribution of differential micropore volume with respect to micropore diameter as measured by the mercury intrusion method, the positive electrode mixture layer 223 may have a first peak at which a micropore diameter D1 satisfies D1≤0.25 µm and a second peak at which a micropore diameter D2 is greater than the micropore diameter D1 at the first peak. In this case, the first peak micropore diameter D1 is attributable to holes in the electrically conductive material 620 in the positive electrode mixture layer 223, and since the first peak micropore diameter D1 is small, the electrically conductive material 620 in the positive electrode mixture layer 223 is densely aggregated. Therefore, electron transfer in the positive electrode mixture layer 223 becomes smoother. As a result, during charging, due to the migration of the electrolyte (lithium ions (Li)) and the transfer of electrons becoming smoother, charging can be performed efficiently and at high speed. In addition, during discharging, due to the migration of the electrolyte (lithium ions (Li)) and the transfer of electrons becoming smoother, the resistance of the battery is reduced and battery output is improved.

Favorably, for example, as shown in FIG. 15, the positive electrode active material 610a has secondary particles 910 formed by an aggregation of a plurality of primary particles of a lithium transition metal oxide and a hollow portion 920 formed in the secondary particles 910. Further favorably, as shown in FIG. 16, the positive electrode active material 610b may have through holes 930 that penetrate the secondary particles 910 so as to connect the hollow portion 920 to the outside.

In this case, for example, the positive electrode active material may be a lithium transition metal oxide which has a layered structure and which contains nickel (Ni) as a constituent element. Furthermore, in a favorable mode, the positive electrode active material may be a lithium transition metal oxide which has a layered structure and which contains nickel (Ni), cobalt (Co), and manganese (Mn) as constituent elements. Moreover, in a favorable mode, the positive electrode active material may be expressed as $Li_{1+x}(Ni_yCo_zMn_{1-y-z}M_v)O_2$, where $0 \leq x \leq 0.2$, $0.5 \leq y \leq 1.0$, $0 \leq z \leq 0.5$, $0 \leq v \leq 0.2$, and $0 \leq (1-y-z)$, and M is composed of at least one element selected from the element group consisting of F, B, Al, W, Mo, Cr, Ta, Nb, V, Zr, Ti, Y, Ca, Mg, Fe, and Na.

Figure 19:
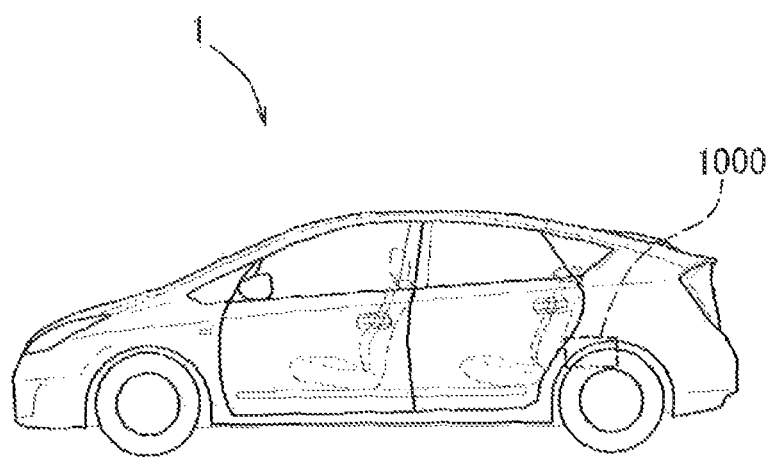
FIG. 19 is a diagram showing an example of a vehicle mounted with a vehicle drive battery.

Furthermore, the present invention can contribute to improving the output of a secondary battery. Therefore, the structure according to the present invention is particularly preferable for use in a secondary battery used as a vehicle drive power supply such as a drive battery of a hybrid vehicle or an electrical vehicle which is required to have superior high-rate output characteristics and high-rate cycling characteristics. In this case, for example, as shown in FIG. 19, the secondary battery can be preferably used as a vehicle drive battery 1000 for driving a motor of a vehicle 1 such as an automobile in the form of an assembled battery in which a plurality of the secondary batteries are connected in series.

Although a secondary battery according to an embodiment of the present invention has been exemplified and various embodiments of the present invention with respect to a mixture layer of the lithium-ion secondary battery have been described, the present invention is not limited to any of the embodiments above. Moreover, while a lithium-ion secondary battery is exemplified above, the present invention may be applied to secondary batteries other than a lithium-ion secondary battery without limitation unless expressly stated otherwise.

REFERENCE SINGS LIST

100 lithium-ion secondary battery (secondary battery)
200 wound electrode body
220 positive electrode sheet
221 positive electrode current collector
222 uncoated portion
222a intermediate portion
223 positive electrode mixture layer
224 positive electrode mixture
240 negative electrode sheet
241 negative electrode current collector
242 uncoated portion
243 negative electrode mixture layer
244 negative electrode mixture
245 heat-resistant layer
262 separator
264 separator
300 battery case
310 gap
320 container main body
322 joint of lid and container main body
340 lid
360 safety valve
420 electrode terminal (positive electrode)
440 electrode terminal (negative electrode)
610, 610a, 610b positive electrode active material
620 electrically conductive material
630 binder
710 negative electrode active material
730 binder
800 evaluation test battery
810 positive electrode sheet
820 negative electrode sheet
830, 840 separator
850 wound electrode body
860 outer case
870 electrode terminal
900 primary particles
910 secondary particles
920 hollow portion
930 through holes
1000 vehicle drive battery

The invention claimed is:

1. A secondary battery comprising:
   a positive electrode mixture layer containing a positive electrode active material and an electrically conductive material;
   a positive electrode current collector on which the positive electrode mixture layer is coated;
   a negative electrode mixture layer containing a negative electrode active material; and
   a negative electrode current collector on which the negative electrode mixture layer is coated, wherein
   a porosity A1 of the positive electrode mixture layer satisfies 0.30 A1, and
   a porosity A2 of the negative electrode mixture layer satisfies 0.30 A2,
   the positive electrode active material is made up of secondary particles resulting from aggregation of a plurality of primary particles of a lithium-transition metal oxide,
   the secondary particles each have a holed hollow structure that has:
      a hollow portion; and
      a through-hole penetrating the secondary particles so as to connect the hollow portion and the outside,
   the hollow portion is a space enclosed by the aggregation of the primary particles in which gaps are substantially not present at the grain boundaries of the primary particles other than the hollow portion and the through-hole, and
   wherein in a micropore distribution of differential micropore volume with respect to a micropore diameter as measured by the mercury intrusion method, the positive electrode mixture layer has a first peak at which a micropore diameter D1 satisfies D1≤0.25 μm and a second peak at which a micropore diameter D2 is greater than the micropore diameter D1 at the first peak.

2. The secondary battery according to claim 1, wherein the porosity A1 of the positive electrode mixture layer satisfies 0.38≤A1.

3. The secondary battery according to claim 1, wherein the porosity A1 of the positive electrode mixture layer satisfies A1≤0.60.

4. The secondary battery according to claim 1, wherein the porosity A2 of the negative electrode mixture layer satisfies 0.38≤A2.

5. The secondary battery according to claim 1, wherein the porosity A2 of the negative electrode mixture layer satisfies A2≤0.60.

6. The secondary battery according to claim 1, wherein the porosity A1 of the positive electrode mixture layer and the porosity A2 of the negative electrode mixture layer satisfy A1≤A2.

7. The secondary battery according to claim 1, wherein the first peak micropore diameter D1 is attributable to holes in the electrically conductive material in the positive electrode mixture layer and the second peak micropore diameter D2 is attributable to holes between particles of the positive electrode active material.

8. The secondary battery according to claim 1, wherein the first peak micropore diameter D1 satisfies 0.05≤D1.

9. The secondary battery according to claim 1, wherein a DBP absorption B of the positive electrode active material satisfies 30 mL/100 g≤B.

10. The secondary battery according to claim 1, wherein a DBP absorption D of the electrically conductive material satisfies 100 mL/100 g≤D.

11. The secondary battery according to claim 1, wherein an opening width of the through hole is on average 0.01 μm or more.

12. The secondary battery according to claim 1, wherein the opening width of the through hole is on average 2.0 μm or less.

13. The secondary battery according to claim 1, wherein a BET specific surface area of the positive electrode active material is 0.5 m$^2$/g to 1.9 m$^2$/g.

14. The secondary battery according to claim 1, wherein the positive electrode active material has an average particle diameter of 3 μm to 10 μm.

15. The secondary battery according to claim 1, wherein the positive electrode active material is a lithium transition metal oxide which has a layered structure and which contains nickel as a constituent element thereof.

16. The secondary battery according to claim 1, wherein the positive electrode active material is a lithium transition metal oxide which has a layered structure and which contains nickel, cobalt, and manganese as constituent elements thereof.

17. The secondary battery according to claim 1, wherein the positive electrode active material is expressed as $Li_{1+x}(Ni_yCo_zMn_{1-y-z}M_\gamma)O_2$ where 0≤x≤0.2, 0.5≤y≤1.0, 0≤z≤0.5, 0≤γ≤0.2, and 0≤(1-y-z), and M is composed of at least one element selected from the element group consisting of F, B, Al, W, Mo, Cr, Ta, Nb, V, Zr, Ti, Y, Ca, Mg, Fe, and Na.

18. The secondary battery according to claim 1, wherein the positive electrode active material is a positive electrode active material produced by a production method comprising:
   a raw material hydroxide formation step of supplying ammonium ions to an aqueous solution of a transition metal compound, and precipitating particles of the transition metal hydroxide from the aqueous solution, this aqueous solution containing at least one transition metal element that composes the lithium transition metal oxide;
   a mixing step of mixing the transition metal hydroxide with a lithium compound to prepare an unfired mixture; and
   a calcining step of calcining the mixture to obtain the active material particles, and wherein
   the raw material hydroxide formation step includes a nucleation stage in which the transition metal hydroxide is precipitated from the aqueous solution at pH 12 or higher and at an ammonium ion concentration of 25 g/L or less and a particle growth stage in which the transition metal hydroxide precipitated in the nucleation stage is grown at a pH of less than 12 and at an ammonium ion concentration of 3 g/L or more.

19. The secondary battery according to claim 18, wherein the calcining step is carried out such that a maximum calcining temperature is 800° C. to 1000° C.

20. The secondary battery according to claim 19, wherein the calcining step includes a first calcining stage in which the mixture is fired at a temperature T1 of 700° C. to 900° C., and a second calcining stage in which the result of the first calcining stage is fired at a temperature T2 of 800° C. to 1000° C. that is higher than the calcining temperature T1 of the first calcining stage.

21. A vehicle drive battery constituted by the secondary battery according to claim 1.

* * * * *